(12) United States Patent
Oguchi

(10) Patent No.: US 8,820,987 B2
(45) Date of Patent: Sep. 2, 2014

(54) LIGHTING DEVICE FOR MORTORCYCLE

(71) Applicant: Honda Motor Co., Ltd., Tokyo (JP)

(72) Inventor: Tsuyoshi Oguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/848,744

(22) Filed: Mar. 22, 2013

(65) Prior Publication Data

US 2013/0258692 A1 Oct. 3, 2013

(30) Foreign Application Priority Data

Mar. 28, 2012 (JP) ................................. 2012-074588

(51) Int. Cl.
*B62J 6/00* (2006.01)
*F21S 8/10* (2006.01)
*B60Q 1/04* (2006.01)
*B62J 6/02* (2006.01)

(52) U.S. Cl.
CPC ................. *F21S 48/10* (2013.01); *F21S 48/15* (2013.01); *B60Q 1/04* (2013.01); *F21S 48/1233* (2013.01); *F21S 48/1208* (2013.01); *F21S 48/1757* (2013.01); *B62J 6/02* (2013.01)
USPC .......................................... 362/473; 362/475

(58) Field of Classification Search
USPC ................................................... 362/473, 475
See application file for complete search history.

(56) References Cited

U.S. PATENT DOCUMENTS

| 2006/0181891 | A1* | 8/2006 | Surawichai et al. | 362/474 |
| 2008/0192498 | A1* | 8/2008 | Suita | 362/475 |
| 2008/0239736 | A1* | 10/2008 | Aoki | 362/475 |
| 2011/0063863 | A1* | 3/2011 | Hotei et al. | 362/475 |

FOREIGN PATENT DOCUMENTS

JP 06-144107 5/1994

* cited by examiner

*Primary Examiner* — Evan Dzierzynski
(74) *Attorney, Agent, or Firm* — Mori & Ward, LLP

(57) ABSTRACT

A lighting device for a motorcycle includes a first lamp, a second lamp, a first outer proximate portion, and a first inner proximate portion. The first outer proximate portion is provided on one of first and second lenses and extends toward another of the first and second lenses along a surface of said one of the first and second lenses. The first inner proximate portion is provided on said one of the first and second lenses and extends toward said another of the first and second lenses. A first gap is provided between the first outer proximate portion and said another of the first and second lenses. A second gap is provided between the first inner proximate portion and said another of the first and second lenses. The second gap is smaller than the first gap.

12 Claims, 22 Drawing Sheets

LIGHTING DEVICE FOR MORTORCYCLE

CROSS-REFERENCE TO RELATED APPLICATIONS

The present application claims priority under 35 U.S.C. §119 to Japanese Patent Application No. 2012-074588, filed Mar. 28, 2012. The contents of this application are incorporated herein by reference in their entirety.

BACKGROUND OF THE INVENTION

1. Field of the Invention

The present invention relates to a lighting device for a motorcycle.

2. Discussion of the Background

Conventionally, there has been known a lighting device which can enhance design property and external appearance property of the whole lighting device by arranging two separate and independent lamps such as a headlight, a side lamp adjacent to each other and by showing lens surfaces of two lighting devices in the form of integral and continuous external appearance.

Japanese Unexamined Patent Application Publication No. JP-A-6-144107 discloses a lighting device where a gap between a lens of a headlight and a lens of the side lamp is maintained at a fixed value by forming a contact portion where housing portions of the respective lamps are brought into contact with each other in arranging the headlight and the side lamp adjacent to each other.

SUMMARY OF THE INVENTION

According to one aspect of the present invention, a lighting device for a motorcycle includes a first lamp, a second lamp, a first outer proximate portion, and a first inner proximate portion. The first lamp includes a first housing and a first lens mounted on the first housing. The second lamp includes a second housing and a second lens mounted on the second housing. The first lamp and the second lamp are arranged on a surface inclined with respect to a plane orthogonal to a front-rear direction of a vehicle body of the motorcycle. The first housing and the second housing are mounted adjacent to each other such that a surface of the first lens and a surface of the second lens are substantially continuous with each other. The first outer proximate portion is provided on one of the first and second lenses and extends toward another of the first and second lenses along a surface of said one of the first and second lenses. The first inner proximate portion is provided on said one of the first and second lenses and extends toward said another of the first and second lenses. The inner proximate portion is provided behind the first outer proximate portion in the front-rear direction of the vehicle body. A first gap is provided between the first outer proximate portion and said another of the first and second lenses. A second gap is provided between the first inner proximate portion and said another of the first and second lenses. The second gap is smaller than the first gap.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
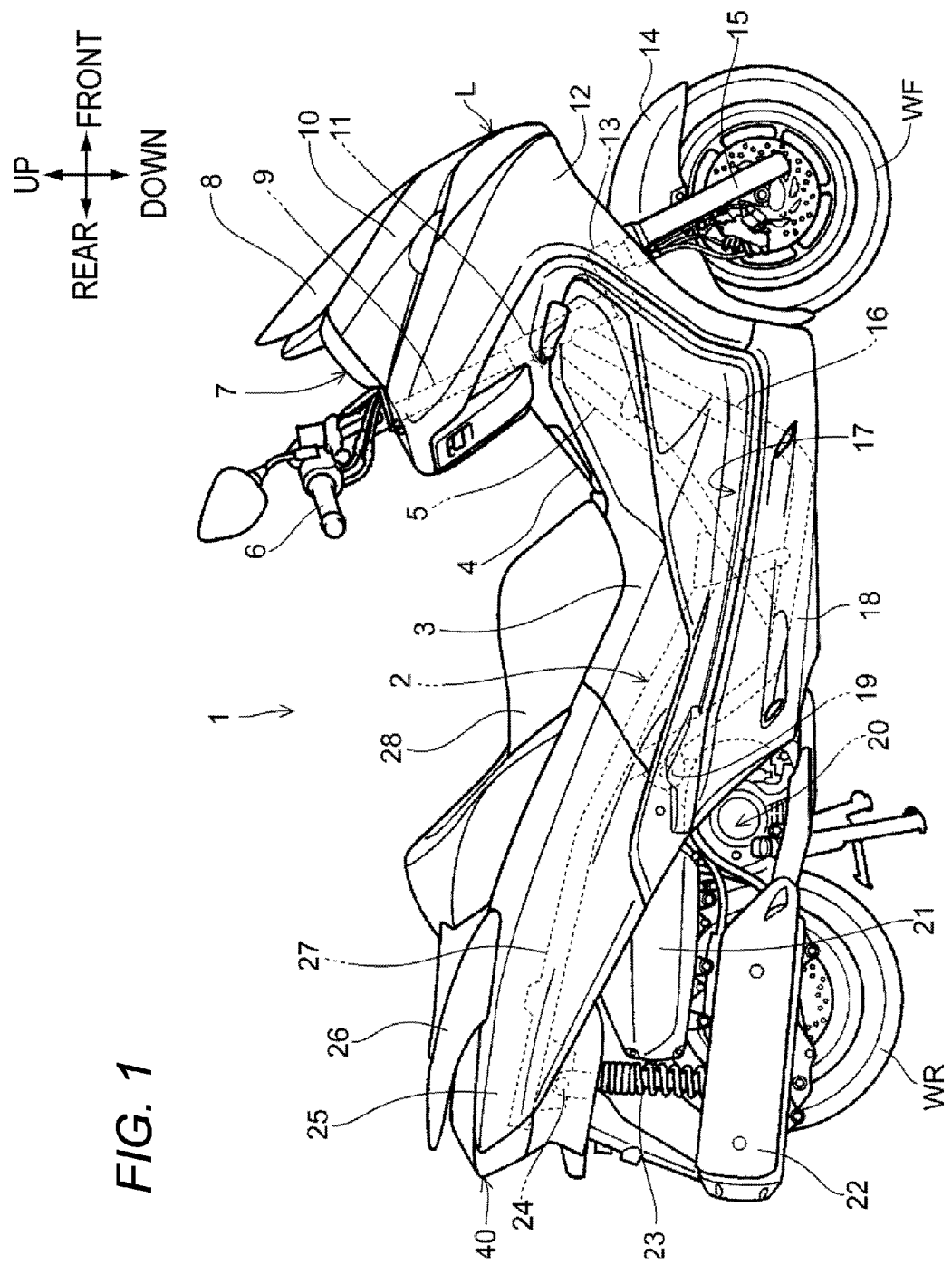
FIG. 1 is a right side view of a motorcycle to which a lighting device according to one embodiment is applied.

The embodiments will now be described with reference to the accompanying drawings, wherein like reference numerals designate corresponding or identical elements throughout the various drawings.

FIG. 1 is a right side view of a motorcycle 1 to which a lighting device according to one embodiment is applied. A vehicle body frame 2 includes a head pipe 11 which rotatably and pivotally supports a steering stem 9, a pair of left and right main frames 5 and a pair of left and right under frames 16 which extend toward a rear lower side of a vehicle body from the head pipe 11, and a rear frame 27 which is connected to a rear side of the main frames 5.

An under bracket 13 which supports a pair of left and right front forks 15 is fixed to a lower end portion of the steering stem 9. On the other hand, a steering handle 6 is mounted on an upper end portion of the steering stem 9. A front wheel WF is rotatably and pivotally supported on a lower end portion of the front fork 15.

A pivot shaft 19 is mounted on a connecting portion between a rear end portion of the main frames 5 and a rear frame 27. A unit swing 20 which is an integral body constituted of an engine and an automatic transmission is swingably and pivotally supported on the pivot shaft 19. A rear wheel WR which constitutes a drive wheel is rotatably and pivotally supported on the unit swing 20, and an air cleaner box 21 and a muffler 22 are supported on the unit swing 20. A rear side of the unit swing 20 is suspended from a pair of left and right rear cushions 23 which is swingably supported on a support portion 24 formed on the rear frame 27.

On a front side of the head pipe 11, a front cowl 10 having a wind screen 8 and a pair of left and right front side cowls 12 are mounted. A lighting device L according to one embodiment is arranged at a position between both cowls 10, 12 which constitute exterior members. A meter device 7 is arranged behind the wind screen 8, and a front fender 14 which is supported on the front fork 15 is arranged above and behind the front wheel WF.

A floor panel 3 which has a straddling portion 4 raised toward an upper side of the vehicle body at the center position in the vehicle widthwise direction and a pair of left and right leg placing floors 17 are provided behind the head pipe 11, and a seat 28 is mounted above the floor panel 3. An under cowl 18 is provided below the leg placing floors 17, and a pair of left and right rear side cowls 25 is mounted on a rear portion of the floor panel 4. A taillight device 40 is arranged behind the rear side cowl 25, and a grab bar 26 is mounted on a rear side of the seat 28.

Figure 2:
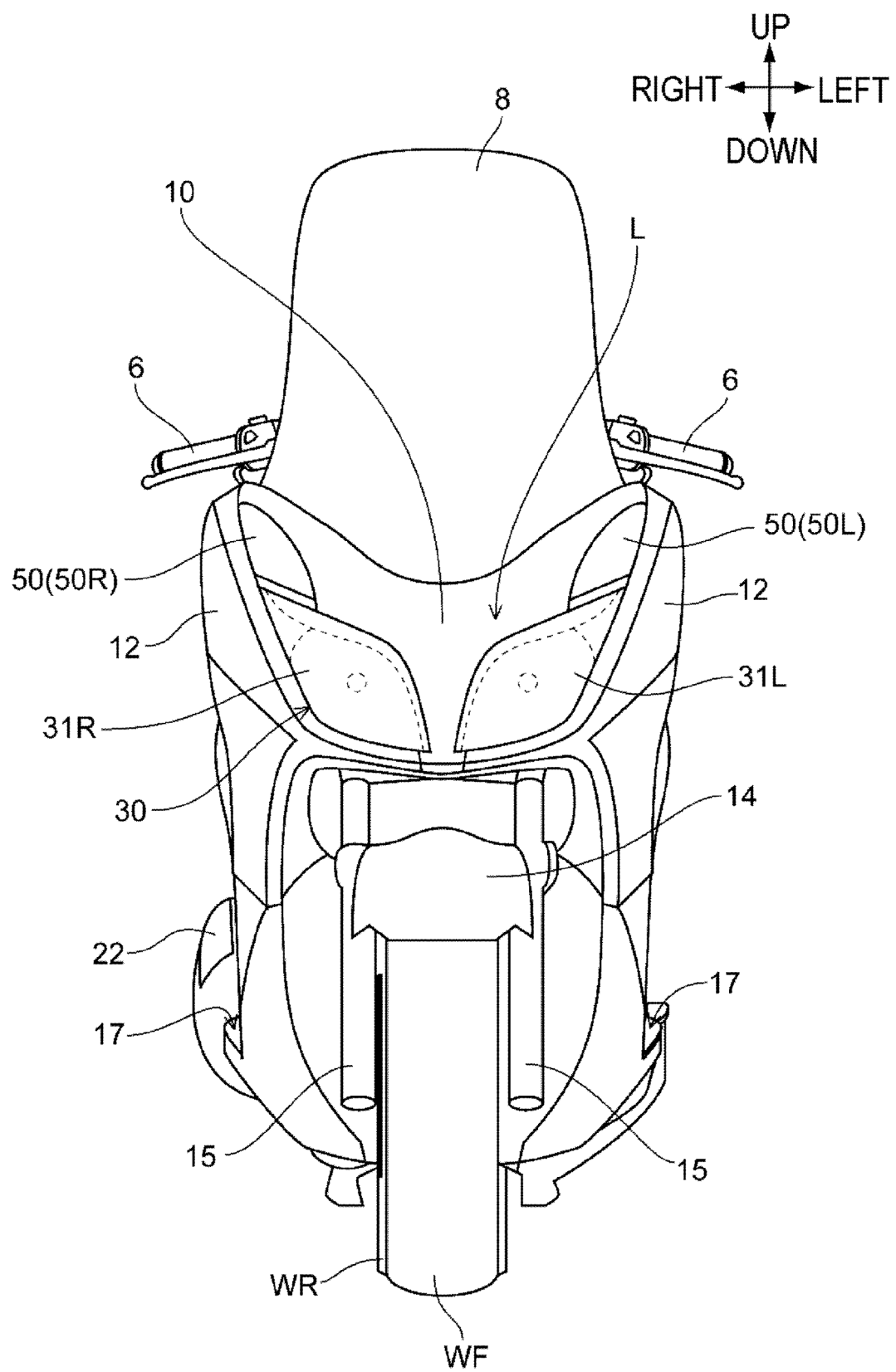
FIG. 2 is a front view of the motorcycle.

FIG. 2 is a front view of the motorcycle 1. The lighting device L according to the embodiment includes a front lamp 30 which constitutes a first lamp having a pair of left and right exposed surfaces 31L, 31R, and a pair of left and right blinker devices 50 (50L, 50R) which constitutes second lamps arranged adjacent to an upper portion of the front lamp 30. The exposed surfaces 31L, 31R of the front lamp 30 and the blinker devices 50 are configured to be exposed toward a front side of the vehicle body through opening portions formed by the front cowl 10 and the pair of left and right front side cowls 12. Shapes of these opening portions can be changed into various shapes regardless of a shape of the lighting device L.

Figure 3:
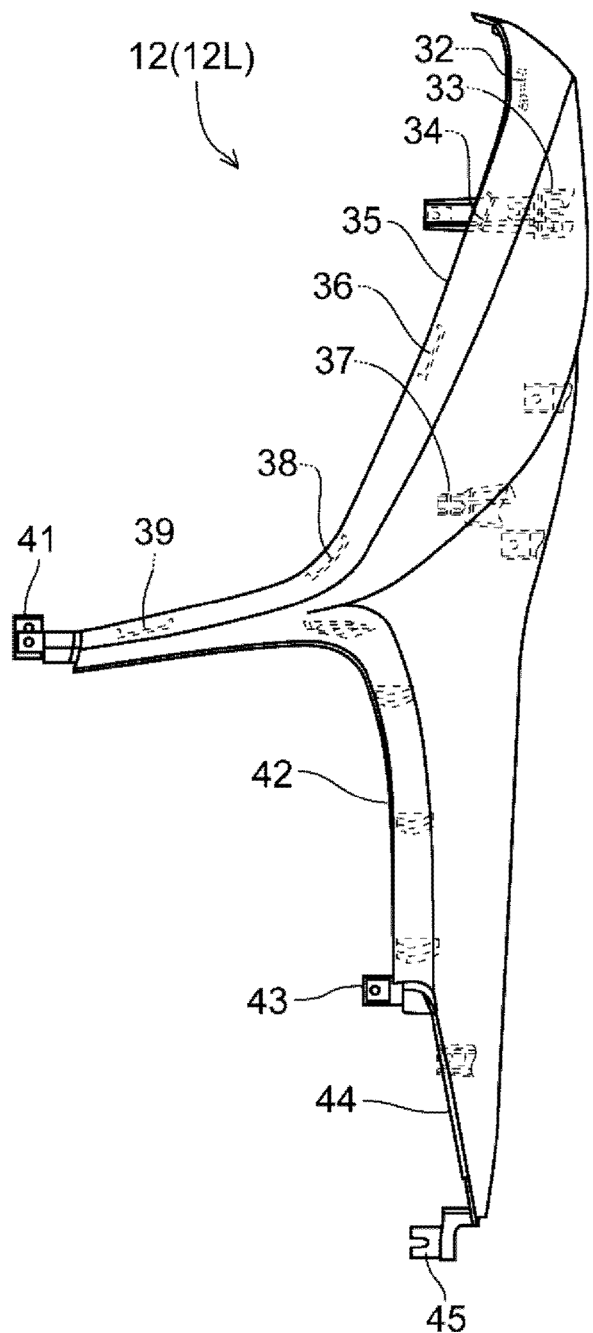
FIG. 3 is a front view of a front side cowl on a left side in the vehicle widthwise direction.
Figure 4:
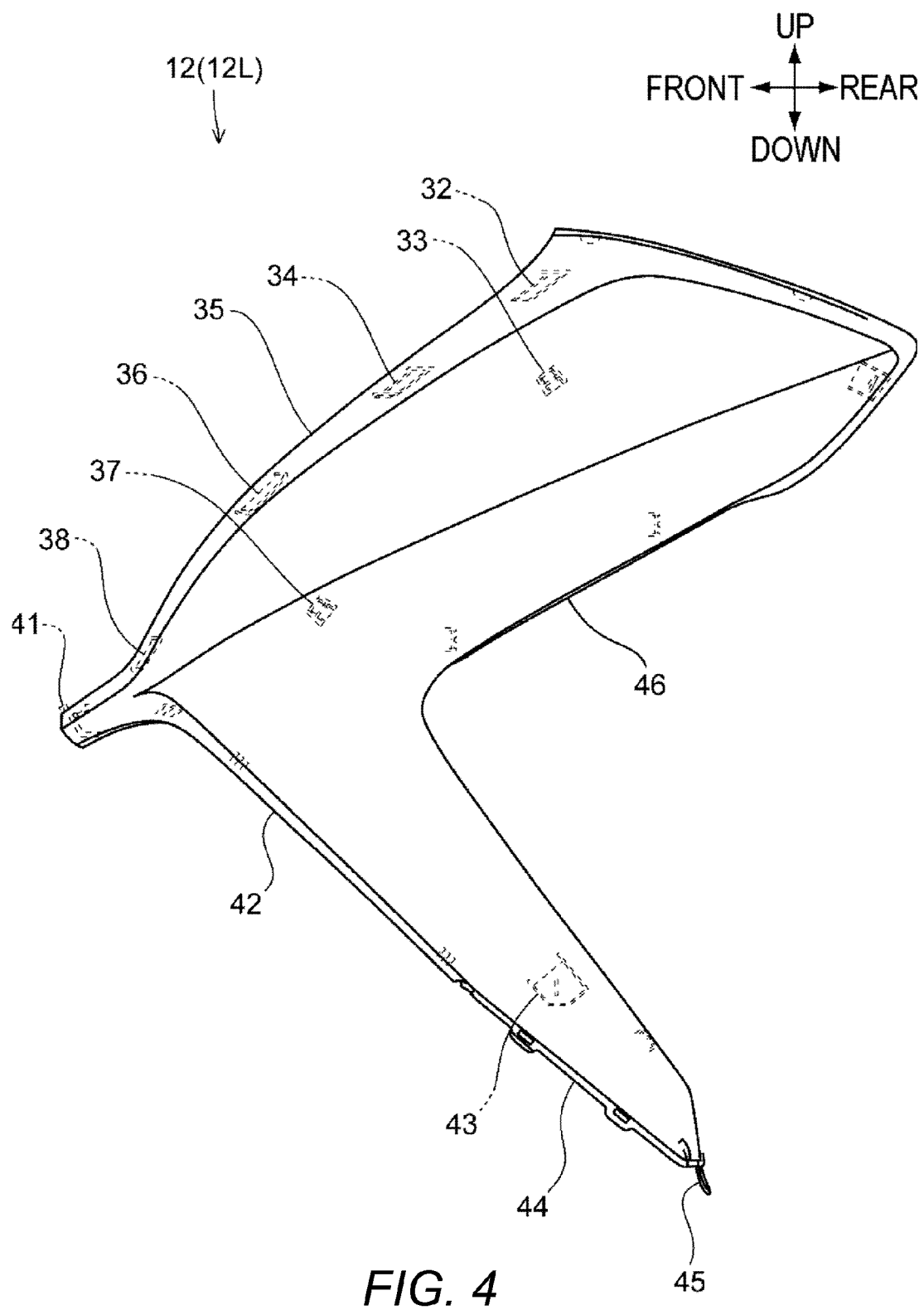
FIG. 4 is a left side view of the front side cowl on a left side in the vehicle widthwise direction.

FIG. 3 is a front view of a front side cowl 12L on a left side in the vehicle widthwise direction. FIG. 4 is a left side view of the front side cowl 12L. The left and right front side cowls 12 formed of a resin-made thin plate member are formed in left-and-right symmetry, and the left and right front side cowls 12 are joined to each other by engaging portions 41 arranged at the center in the vehicle widthwise direction. A lower end portion of the front cowl 10 is also engaged with the engaging portions 41.

A front upper edge portion 35 of the front side cowl 12 as viewed in the longitudinal direction of the vehicle body defines an outer profile of the lighting device L in the vehicle widthwise direction. Engaging portions 32, 33, 34 which are engaged with the blinker device 50 and engaging portions 36, 37, 38, 39 which are engaged with the front lamp 30 are formed on the front side cowl 12 in the vicinity of the edge portion 35. A front lower edge portion 42 of the front side cowl 12 as viewed in the longitudinal direction of the vehicle body is joined to a cover member (not shown in the drawing) positioned behind the front wheel WF, and a rear edge portion 46 of the front side cowl 12 as viewed in the longitudinal direction of the vehicle body is engaged with a front end portion of the floor panel 3. Further, the front side cowl 12 is joined to an under cowl 18 (see FIG. 1) by a mounting stay 43 formed on a lower side of the edge portion 42 and a mounting stay 45 formed on a lower side of the edge portion 44.

Figure 5:
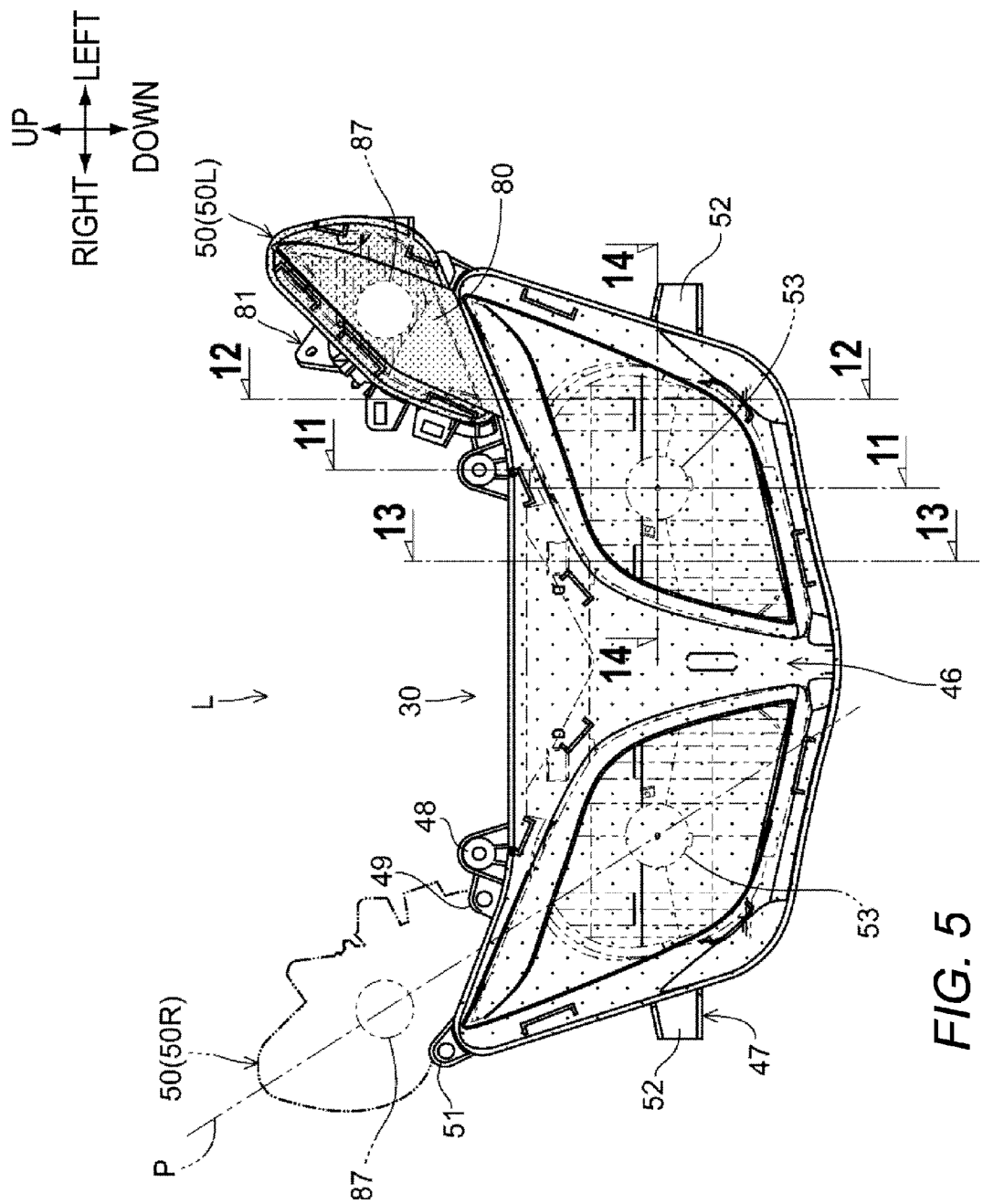
FIG. 5 is a front view of the lighting device.
Figure 6:
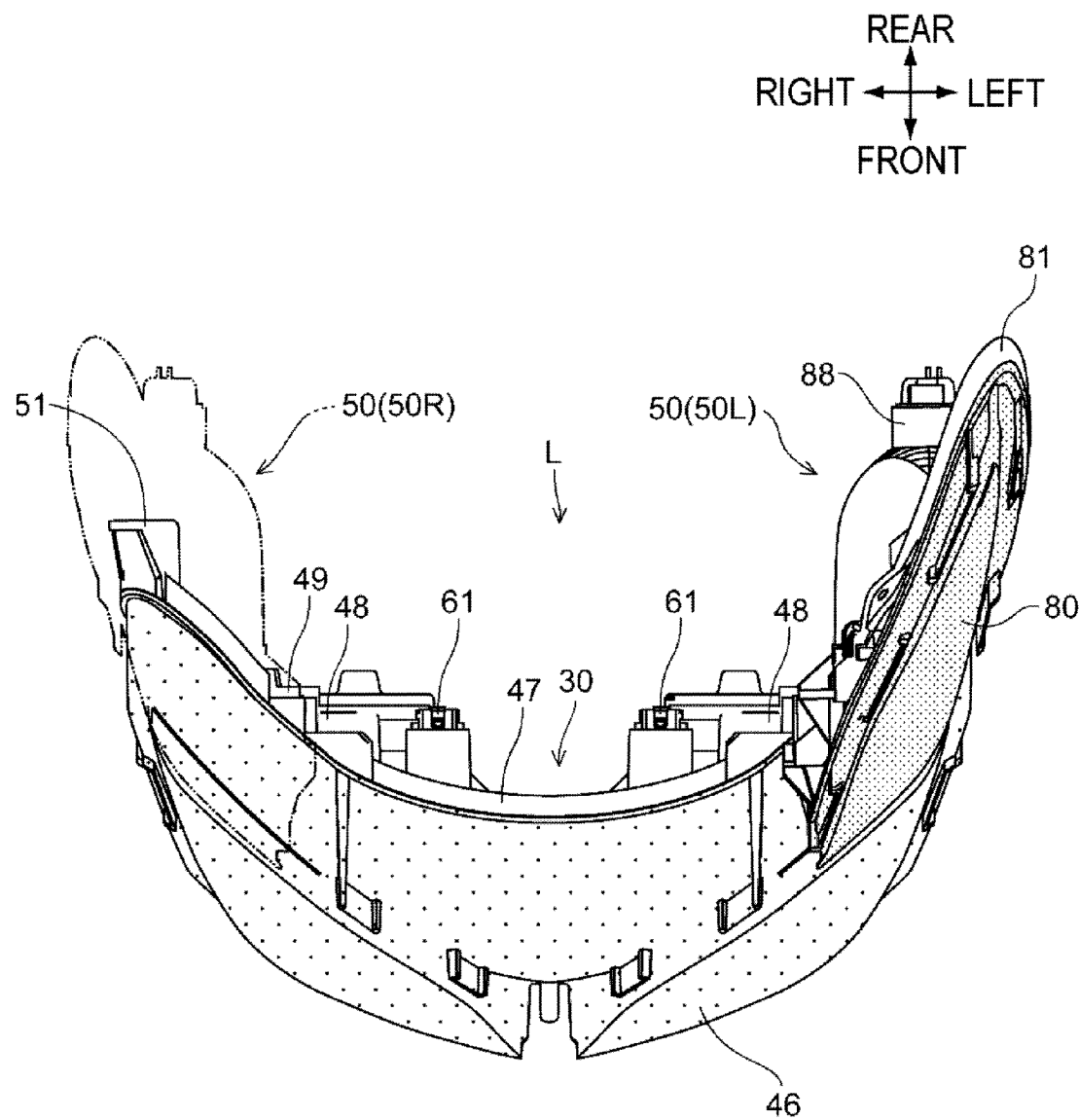
FIG. 6 is a plan view of the lighting device.
Figure 7:
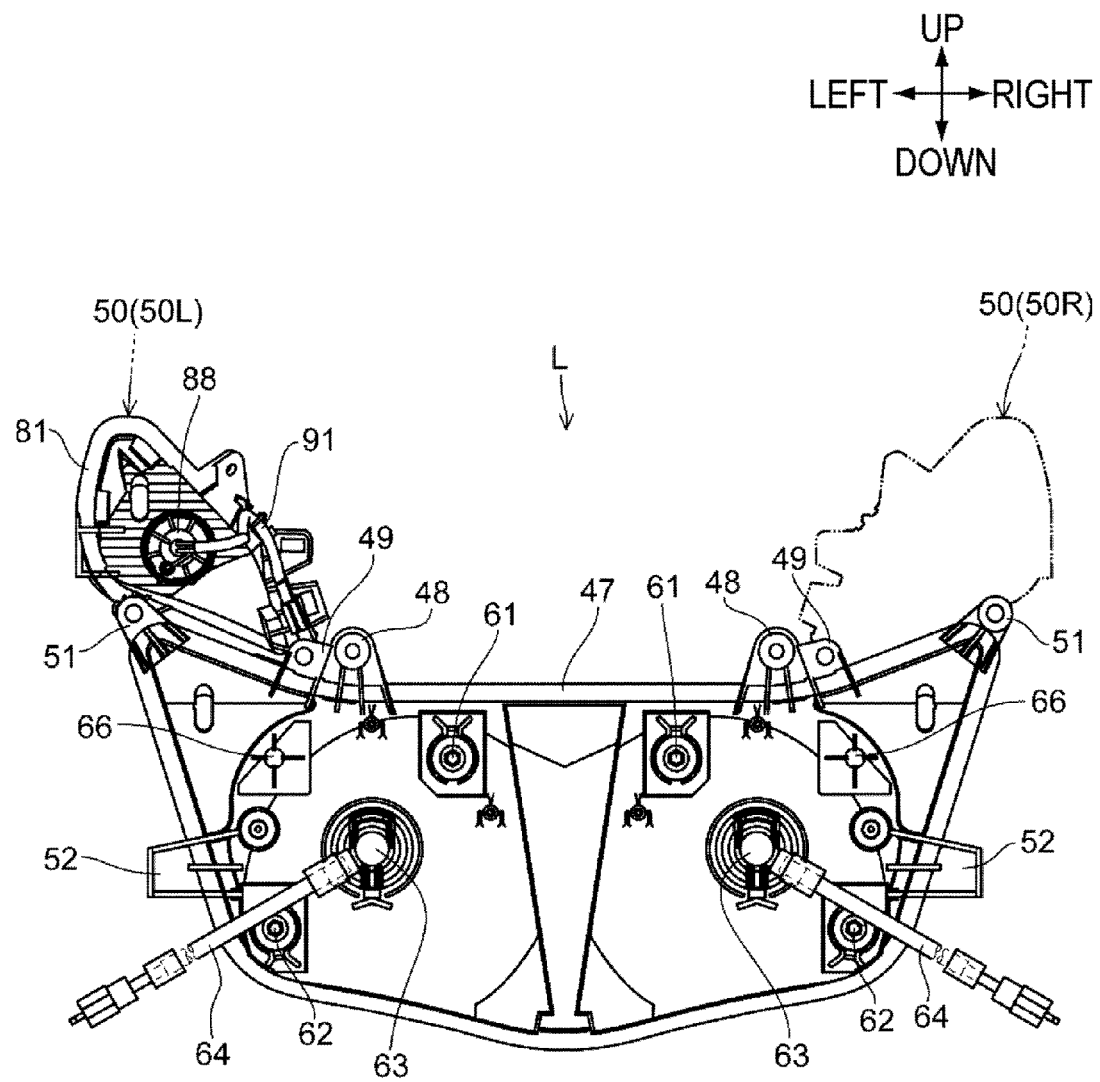
FIG. 7 is a back view of the lighting device.
Figure 8:
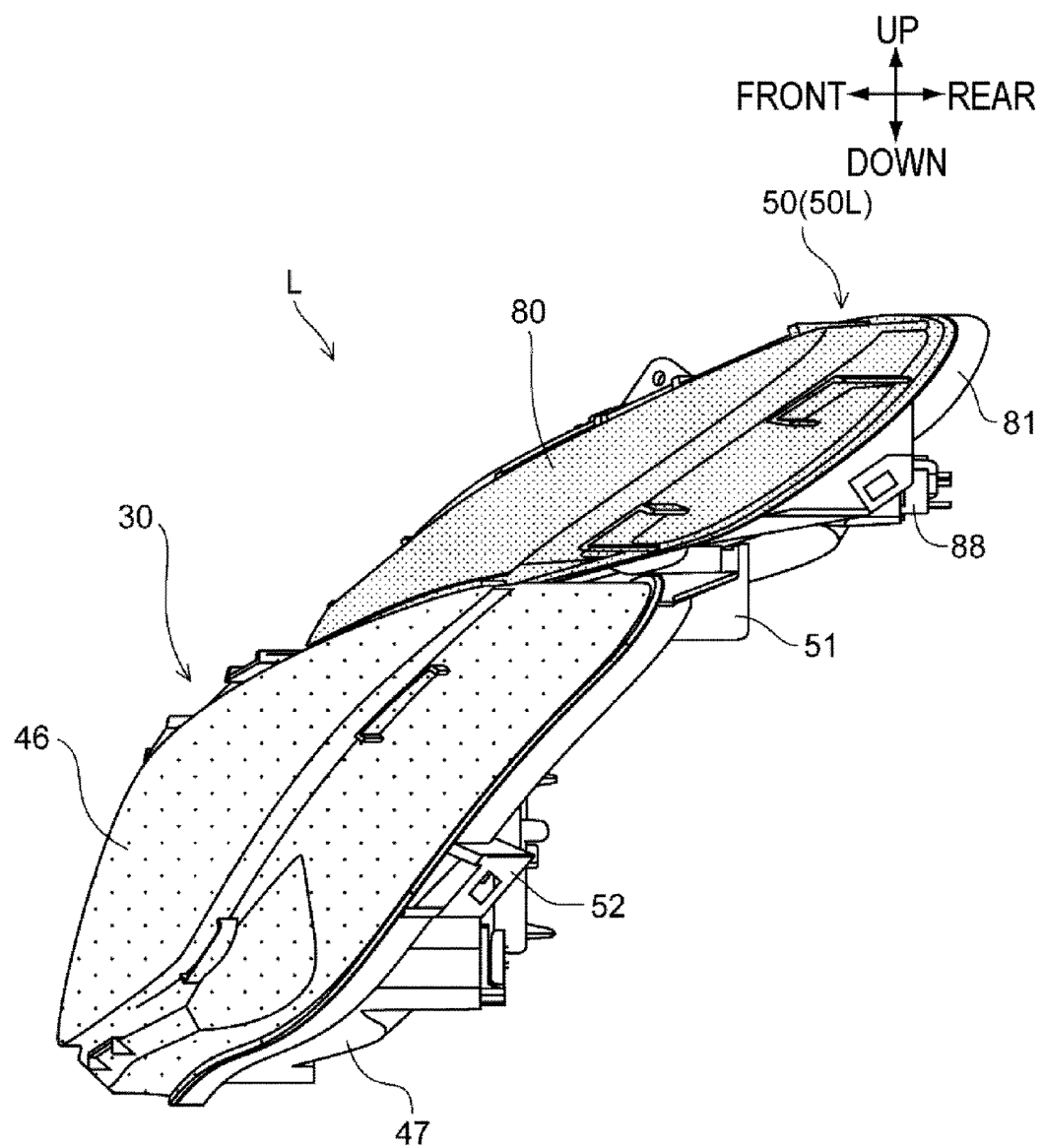
FIG. 8 is a left side view of the lighting device.

FIG. 5 is a front view of the lighting device L. FIG. 6 is a plan view of the lighting device L, FIG. 7 is a back view of the lighting device L, and FIG. 8 is a left side view of the lighting device L. In this embodiment, the lighting device L is constituted by mounting the pair of left and right blinker devices 50 (50L, 50R) which constitute the second lamps on an upper portion of the front lamp 30 which constitutes the first lamp. In FIG. 3 to FIG. 5, only the blinker device 50L on a left side is indicated by a solid line. A plane P shown in FIG. 5 indicates a plane which passes the center of a front lamp bulb 53 and the center of a blinker bulb 87, and is arranged parallel to the vehicle body advancing direction.

The front lamp 30 is constituted such that a pair of left and right reflectors (described later) and a front lamp bulb 53 are housed in the inside of a front lamp housing 47 which is made of a black (or other color) resin or the like and constitutes a first housing, and a front lamp outer lens 46 which is made of a non-colored transparent resin or the like and constitutes a first lens (roughly-meshed hatching portion) is mounted on the front lamp housing 47. A pair of left and right mounting stays 49, 51 for mounting the blinker device 50 is formed on an upper portion of the front lamp housing 47.

On the other hand, the blinker device 50 is configured such that a colored transparent blinker inner lens (described later) and a white blinker bulb 87 are housed in the inside of a blinker housing 81 which is made of a black (or other color) resin or the like and constitutes a second housing, and a blinker outer lens 80 which is made of a non-colored transparent resin or the like and constitutes a second lens (fine-meshed hatching portion) is mounted on the blinker housing 81. The blinker device 50 is fixed to the front lamp housing 47 of the front lamp 30 by fastening members such as screws using mounting stays (described later) formed on the housing 81.

While the front lamp 30 is supported from behind in the longitudinal direction of the vehicle body by stays (not shown in the drawing) extending toward a front side of the vehicle body from the head pipe 11 of the motorcycle 1 (see FIG. 1), the front lamp 30 is supported on the front cowl 10 and the pair of left and right front side cowls 12 by a plurality of mounting stays formed around the front lamp 30 and the blinker devices 50. A pair of left and right mounting stays 48 formed on an upper portion of the front lamp housing 47 are fixed to a back surface of the front cowl 10. Further, mounting stays 52 formed on both end portions of the front lamp housing 47 in the vehicle widthwise direction are fixed to the engaging portions 37 of the front side cowls 12 (see FIG. 3 and FIG. 4).

As shown in FIG. 6, the front lamp 30 is formed into a largely curved shape such that the front lamp 30 projects toward a front side of the vehicle body as viewed in a plan view of the vehicle body, and the lighting device L is formed into an approximately U shape by mounting the blinker devices 50 on both ends of the front lamp 30 respectively.

To explain this embodiment in conjunction with FIG. 7, on a back surface side of the front lamp housing 47, sockets 63 of the front lamp bulbs 53 and lines 64 which are connected to the sockets 63 are arranged. Further, a pair of left and right ball-type support portions 66 which constitutes rotary support portions for reflectors (see FIG. 9) which are supported on the front lamp housing 47 in an angle adjustable manner, and a pair of left and right angle adjustment screw mechanisms 61, 62 which constitutes adjustment support portions are provided around the sockets 63. The optical axis adjustment in the vertical direction is performed by the angle adjustment screw mechanisms 62 arranged on a lower side of the vehicle body, and the optical axis adjustment in the lateral direction is performed by the angle adjustment screw mechanisms 61 arranged on an upper side of the vehicle body.

On a back surface side of the blinker housing 81 of the blinker device 50, a socket 88 of the blinker bulb 87 and a line 91 connected to the socket 88 are arranged. The blinker housing 81 is brought into contact with the mounting stays 49, 51 formed on the front lamp housing 47 from a front side in the longitudinal direction of the vehicle body, and is fixed to the front lamp housing 47 by screw members (not shown in the drawing) inserted from behind in the longitudinal direction of the vehicle body.

To explain this embodiment in conjunction with FIG. 6 and FIG. 8, when the lighting device L is constituted by mounting the blinker devices 50 on the upper portion of the front lamp 30, a continuous surface is formed by a surface of the front lamp outer lens 46 and surfaces of the blinker outer lenses 80. To be more specific, the surface of the front lamp outer lens 46 and the surfaces of the blinker outer lenses 80 form a continuous surface inclined with respect to a plane orthogonal to the advancing direction of the motorcycle 1, that is, in this embodiment, a continuous surface which is inclined rearwardly and upwardly toward a rear side of the vehicle body and also outwardly in the vehicle widthwise direction is formed. In this embodiment, even when such a continuous surface is formed, gaps formed between the front lamp outer lens 46 and the blinker outer lenses 80 can be suppressed to a minimum value and hence, the lighting device L is designed to enhance high-grade feeling of the external appearance property without making these gaps conspicuous.

Figure 9:
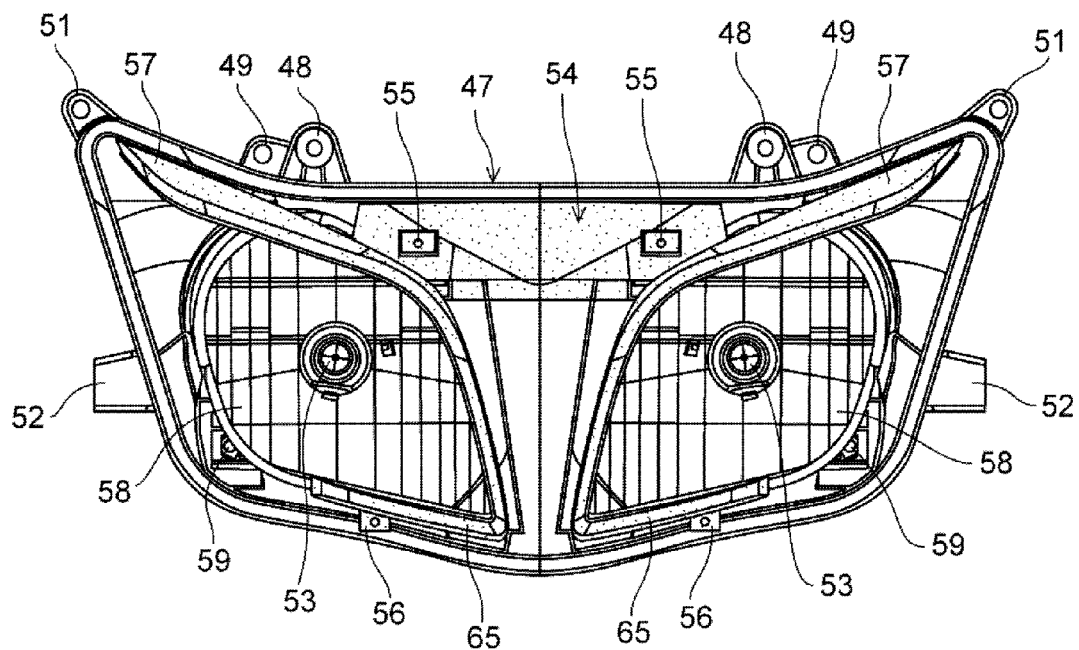
FIG. 9 is a front view showing a state where a front lamp outer lens is removed from a front lamp housing.
Figure 10:
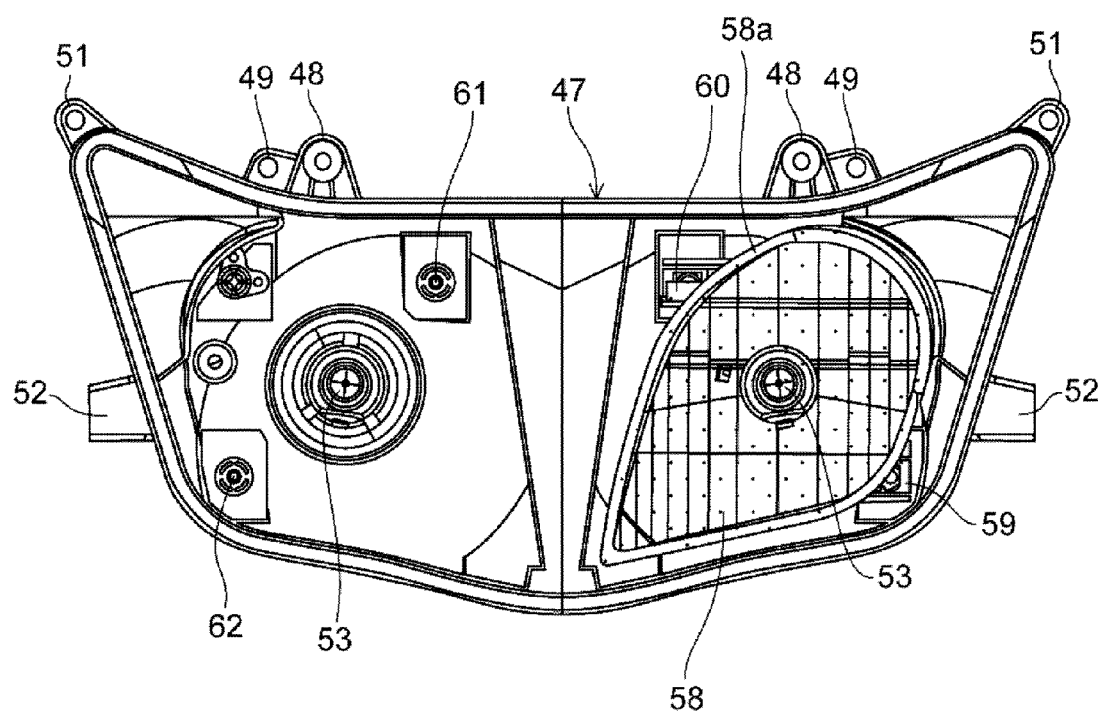
FIG. 10 is a front view showing a state where an extension is removed from the front lamp housing.

FIG. 9 is a front view of the lighting device L in a state where the front lamp outer lens 46 is removed from the front lamp housing 47. FIG. 10 is an explanatory view of the structure of the lighting device L in a state where an extension 54 which constitutes a light blocking member is removed from the front lamp housing 47.

As described previously, the front lamp 30 is configured such that the reflector 58 whose angle is changeable and the front lamp bulb 53 are housed in the inside of the front lamp housing 47, the extension 54 (fine-meshed hatching portion) is mounted so as to cover a portion of the reflector 58 (roughly-meshed hatching portion), and the front lamp outer lens 46 is mounted on the extension portion 54. Surface finish such as plating or metal vapor deposition is applied to a reflection surface of the reflector 58 and a surface of the extension 54.

The pair of left and right reflectors 58 are configured such that the reflectors 58 are swingably supported on the ball type support portions 66, and are engaged with the angle adjustment screw mechanisms 61 on an upper side of the vehicle body and the angle adjustment screw mechanisms 62 on a lower side of the vehicle body so that the optical axis adjustment of the front lamp 30 can be performed by manipulating the respective mechanisms 61, 62. As viewed in a front view, on the reflector 58, an engaging projection 60 which is engaged with the ball-type support portion 66 and an engaging projection 59 which is engaged with the angle adjustment screw mechanism 62 on a lower side of the vehicle body are formed in such a manner that the engaging projections 60, 59 project outwardly from the reflection surface of the reflector 58.

The extension 54 has an extending portion 57 which continuously covers an area ranging from an inner edge of the reflector 58 on a vehicle inner side to an upper edge portion 58a of the reflector 58 on an upper side of the vehicle body. Particularly, the upper edge portion 58a on an upper side of the vehicle body is covered with the elongated extending portion 57, and the extending portion 57 is formed into a shape extending upwardly and outwardly in the vehicle widthwise direction thus imparting an external appearance similar to an eye of an animal with an upturned blow. The extensions 54 are fixed to the front lamp outer lens 46 from behind in the longitudinal direction of the vehicle body by screw members which penetrate a pair of left and right upper mounting holes 55 and a pair of left and right lower mounting holes 56 formed in lower edge portions 65 (see FIG. 13).

Figure 11:
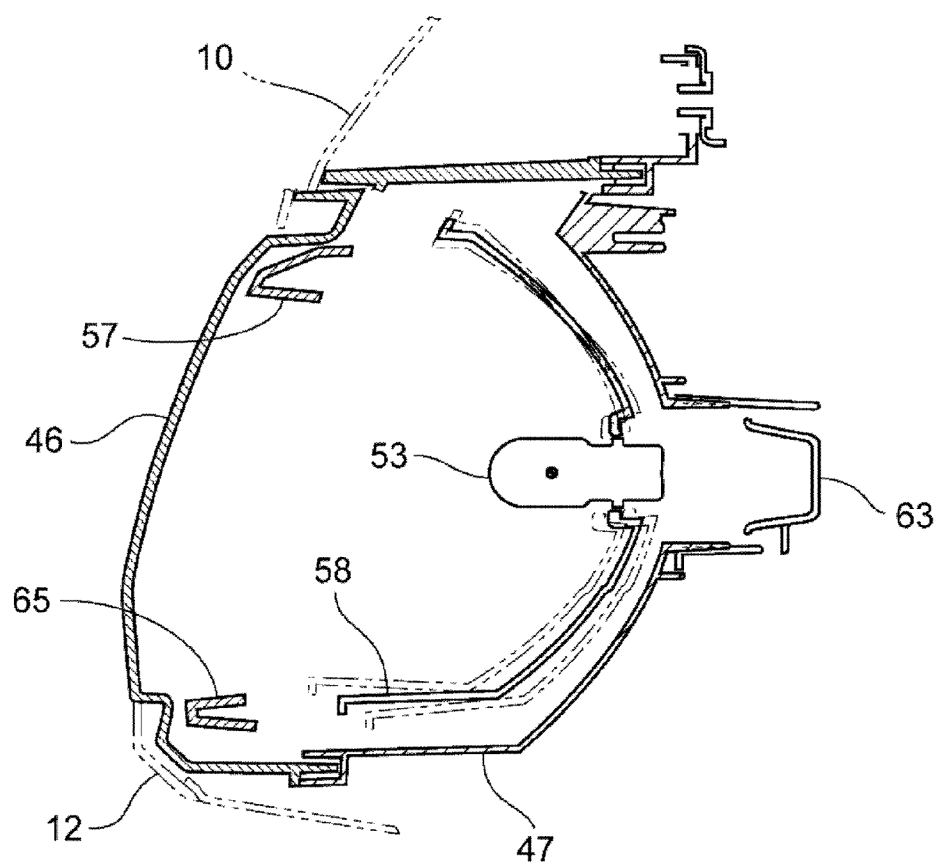
FIG. 11 is a cross-sectional view taken along a line 11-11 in FIG. 5.

FIG. 11 is a cross-sectional view taken along a line 11-11 in FIG. 5. The optical axis adjustment mechanism of the front lamp 30 is configured such that only the reflector 58 can change an angle thereof while the front lamp bulb 53 is being supported on the socket 63. The extension 54 arranged in the vicinity of the front lamp outer lens 46 is formed by molding a resin-made thin-plate member such that the resin-made thin-plate member projects toward a front side of the vehicle body.

Figure 12:
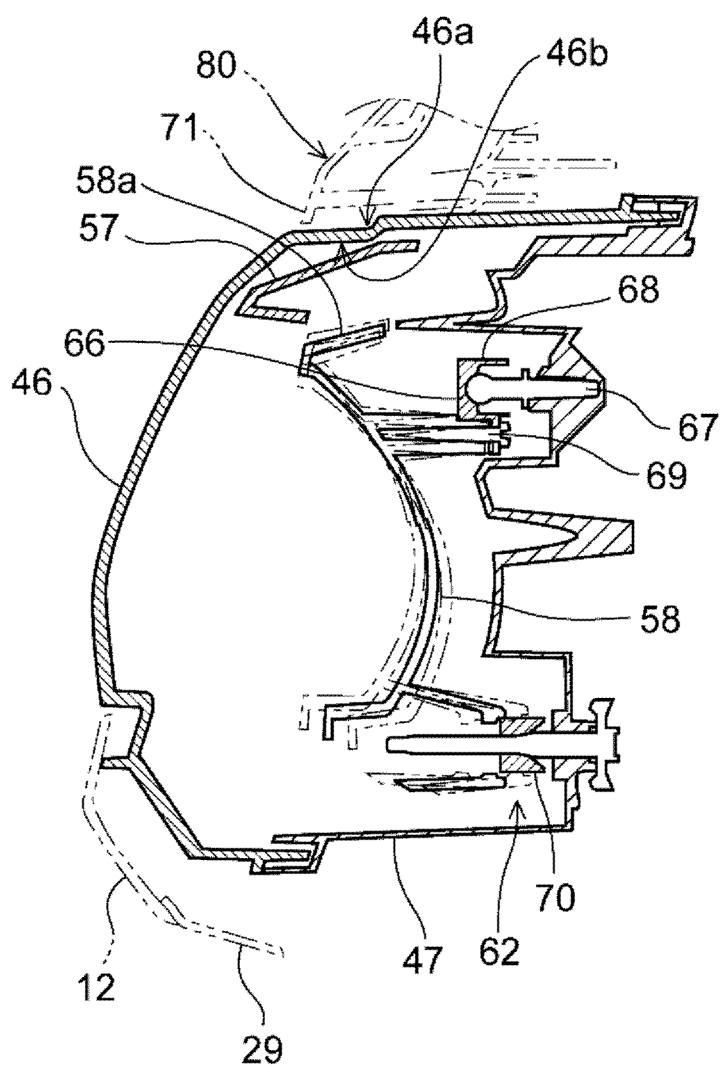
FIG. 12 is a cross-sectional view taken along a line 12-12 in FIG. 5.

FIG. 12 is a cross-sectional view taken along a line 12-12 in FIG. 5. The ball-type support portion 66 is configured such that a ball joint screw 67 is mounted in the inside of the front lamp housing 47, a ball engaging member 68 is fixed to a vehicle-body rear side of the reflector 58 using a screw 69, and the ball engaging member 68 and the ball joint screw 67 are engaged with each other. The upper and lower angle adjustment screw mechanisms 61, 62 have the same structure where the aiming adjustment can be performed by rotating a dial-mounted screw which is threadedly engaged with a female screw member 70 fixed to the reflector 58.

The extending portion 57 of the extension 54 (see FIG. 9) is provided above an upper edge portion 58a of the reflector 58. Accordingly, although there is small possibility that an illumination light from the front lamp bulb 53 reaches an area above the extending portion 57, in this embodiment, to prevent even a slight leakage light from reaching an area above the front lamp outer lens 46, surface treatment such as black coating which has high light blocking property is applied to a lower surface portion 46b positioned on a vehicle-body front side of a stepped portion 46a. Due to such a constitution, it is possible to prevent a possibility that a leakage light reaches a plate-shaped outer proximate portion 71 formed on the blinker outer lens 80 of the blinker device 50 so that the outer proximate portion 71 shines. The light blocking treatment applied to the lower surface portion 46b may be applied to a side behind the stepped portion 46a in the longitudinal direction of the vehicle body beyond the stepped portion 46a. The detail of the structure of the outer proximate portion 71 is described later. A lower edge portion of the front side cowl 12 is engaged with a vehicle body cover 29 positioned behind the front wheel WF.

Figure 13:
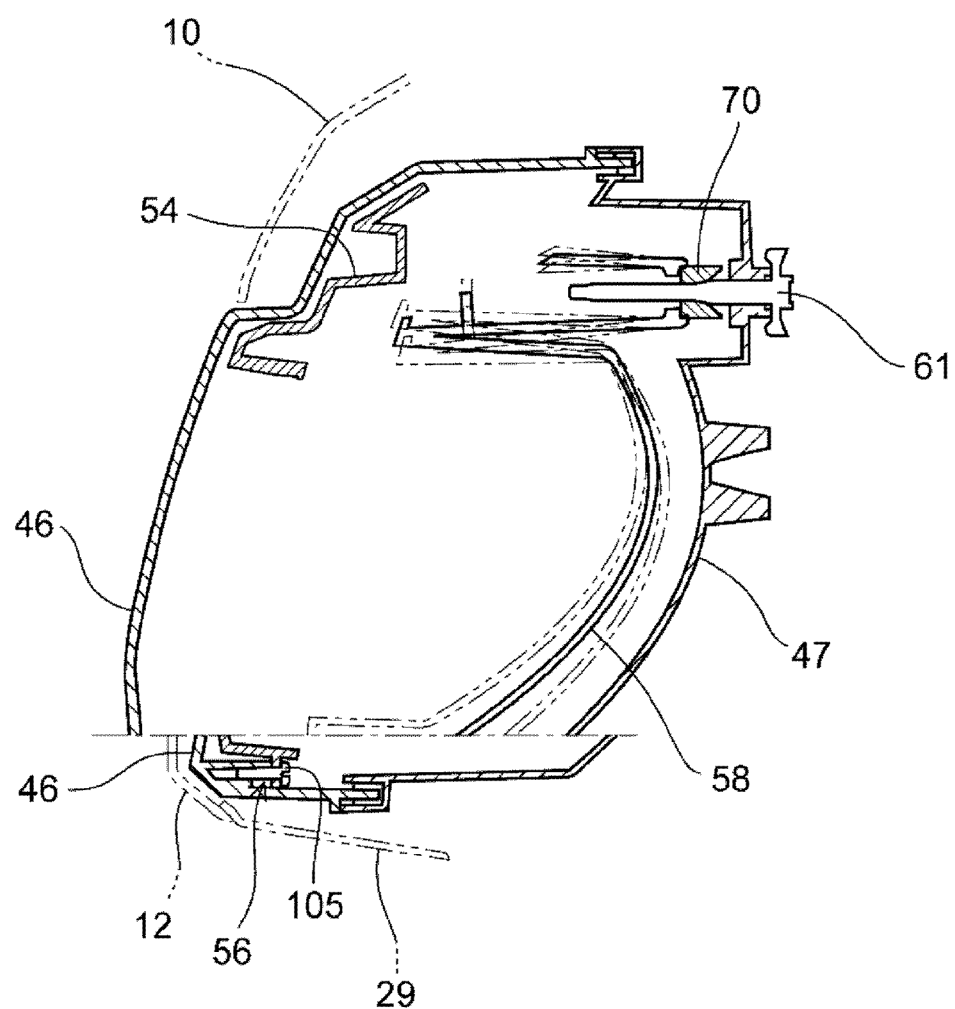
FIG. 13 is a cross-sectional view taken along a line 13-13 in FIG. 5.

FIG. 13 is a cross-sectional view taken along a line 13-13 in FIG. 5. The upper angle adjustment screw mechanism 61 has the same structure as the lower angle adjustment screw mechanism 62 (see FIG. 12). Although the upper angle adjustment screw mechanism 61 is positioned outside a profile of the reflector 58, the angle adjustment screw mechanism 61 is covered with the extension 54 and hence, there is no possibility that the angle adjustment screw mechanism 61 is viewed with naked eyes as viewed in a front view of the vehicle body. A screw member 105 for fixing the extension 54 to the front lamp outer lens 46 is inserted into the lower mounting hole 56 formed in the extension 54.

Figure 14:
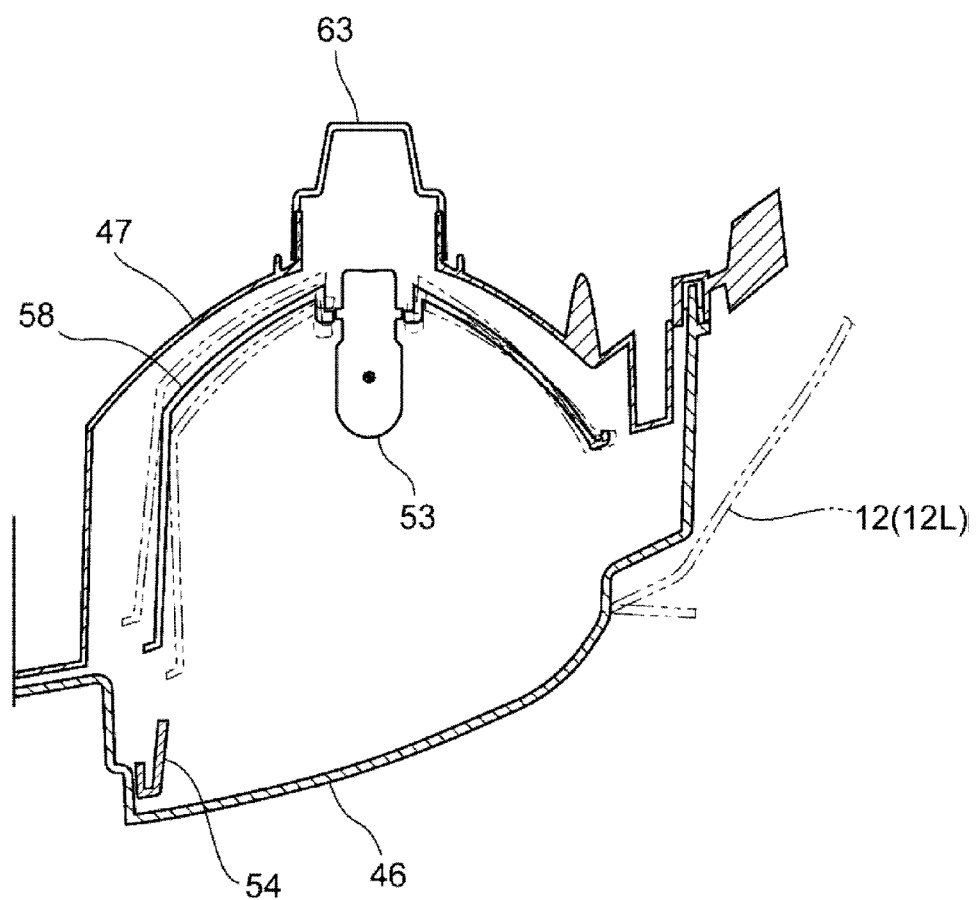
FIG. 14 is a cross-sectional view taken along a line 14-14 in FIG. 5.

FIG. 14 is a cross-sectional view taken along a line 14-14 in FIG. 5. A front surface of the front lamp outer lens 46 is inclined rearwardly and upwardly toward a rear side of the vehicle body and also outwardly in the vehicle widthwise direction. The extension 54 is arranged such that an edge portion of the reflector 58 on an inner side in the vehicle widthwise direction is not viewed from the outside even when the reflector 58 has an angle thereof adjusted toward the outside in the vehicle widthwise direction. Further, an end portion of the front lamp outer lens 46 on an outer side in the vehicle widthwise direction is covered with the front side cowl 12.

Figure 15:
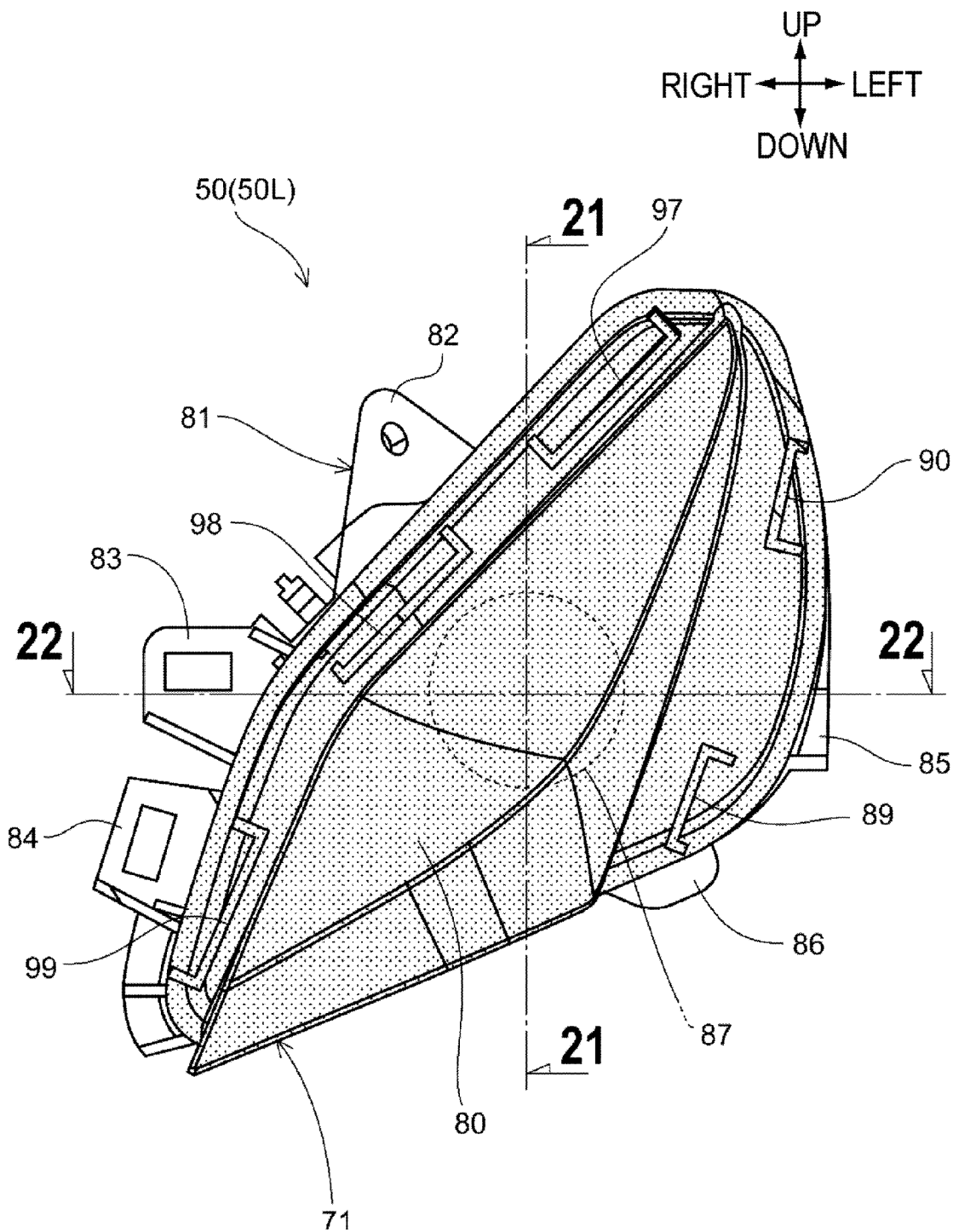
FIG. 15 is a front view of a blinker device.

FIG. 15 is a front view of the blinker device 50. The blinker outer lens 80 (hatching portion) which covers the blinker housing 81 is made of a non-colored transparent resin or the like. Positioning projections 89, 90 which are engaged with the engaging portions 32, 33 of the front side cowl 12 (see FIG. 2 and FIG. 3) are formed on an outer side of the blinker outer lens 80 in the vehicle widthwise direction. Further, positioning projections 97, 98, 99 which are engaged with engaging portions (not shown in the drawing) formed on the front cowl 10 are formed on an inner side of the blinker outer lens 80 in the vehicle widthwise direction. Further, engaging portions 85, 86 which are engaged with the front side cowl 12 and the front lamp housing 47 are formed on an outer side of the blinker housing 81 in the vehicle widthwise direction, and engaging portions 82, 83, 84 which are engaged with the front cowl 10 are formed on an inner side of the blinker housing 81 in the vehicle widthwise direction.

The above-mentioned respective engaging portions are positioned outside the opening portion formed by the front cowl 10 and the front side cowls 12 so that there is no possibility that the respective engaging portions are visually recognized from the outside when the front cowl 10 and the front side cowls 12 are mounted on the vehicle body. On the other hand, on a vehicle-body lower side of the blinker outer lens 80, the outer proximate portion 71 which extends downwardly so as to cover the front lamp outer lens 46 of the front lamp 30 as viewed in a front view of the vehicle body is formed.

Figure 16:
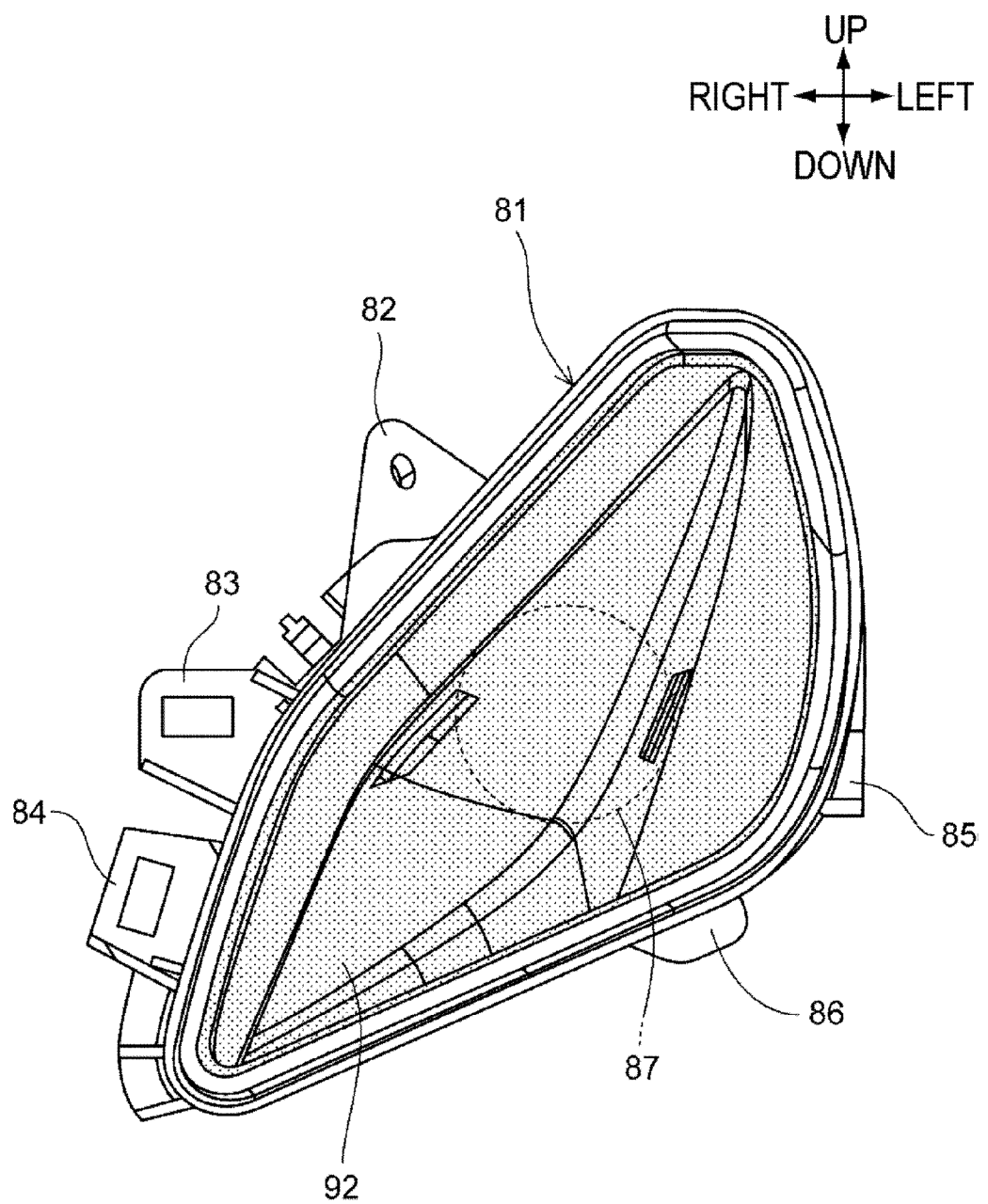
FIG. 16 is a front view showing a state where a blinker outer lens is removed from a blinker housing.
Figure 17:
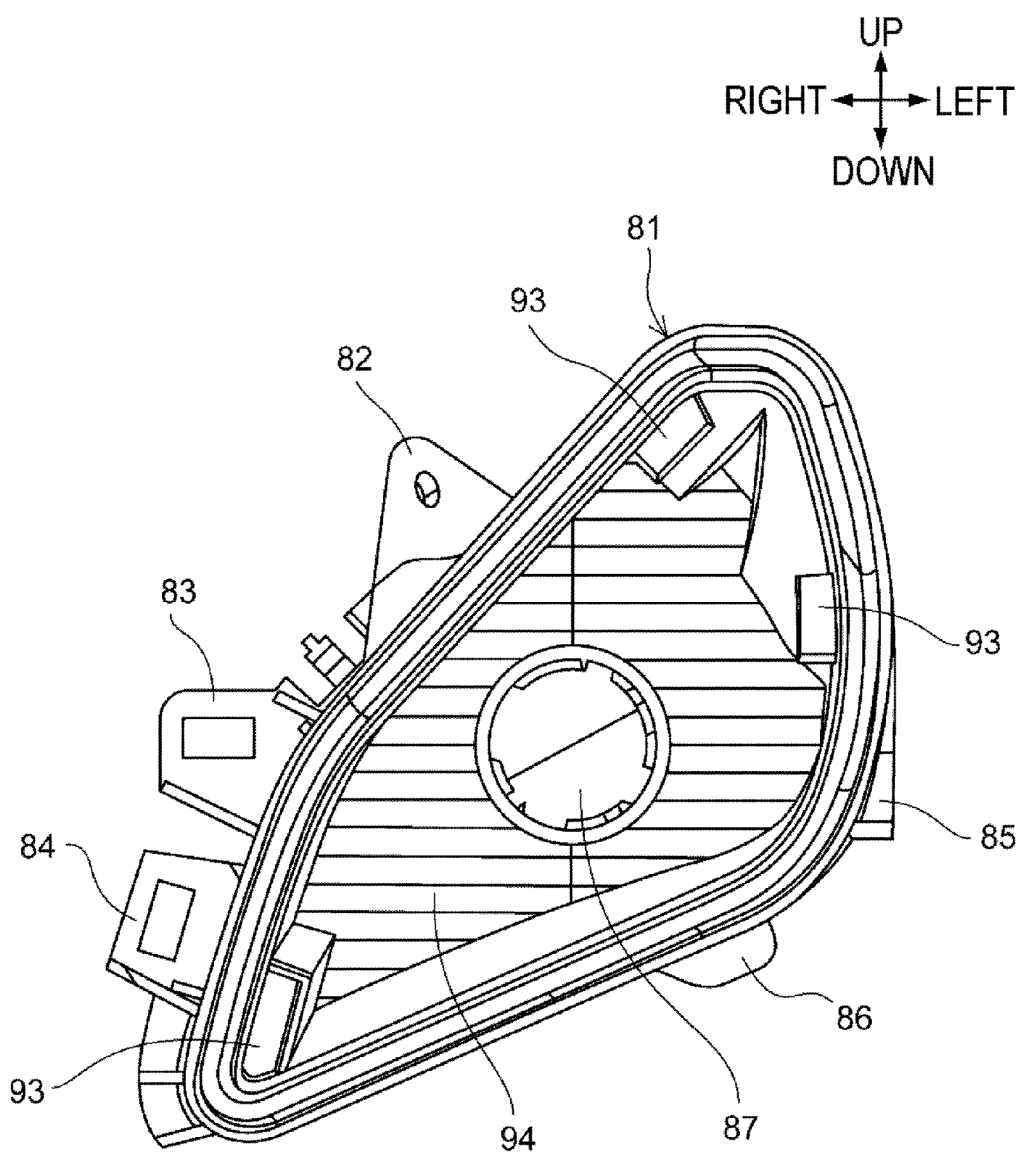
FIG. 17 is a front view showing a state where a blinker inner lens is removed from the blinker housing.

FIG. 16 is a front view of the blinker housing 81 in a state where the blinker outer lens 80 is removed from the blinker housing 81. FIG. 17 is a front view of the blinker housing 81 in a state where a blinker inner lens 92 is removed from the blinker housing 81. When the blinker outer lens 80 is removed from the blinker housing 81, the colored transparent blinker inner lens 92 of orange color or the like appears. The blinker inner lens 92 has a shape such that the blinker inner lens 92 falls inside an outer edge of the blinker housing 81, and the blinker inner lens 92 is fixed to the blinker housing 81 by thermal welding at a bonding portion 93 formed on the blinker housing 81. The blinker housing 81 is made of a black (or other color) resin, and surface treatment such as plating or metal vapor deposition is applied to the reflector surface 94 of the blinker housing 81.

Figure 18:
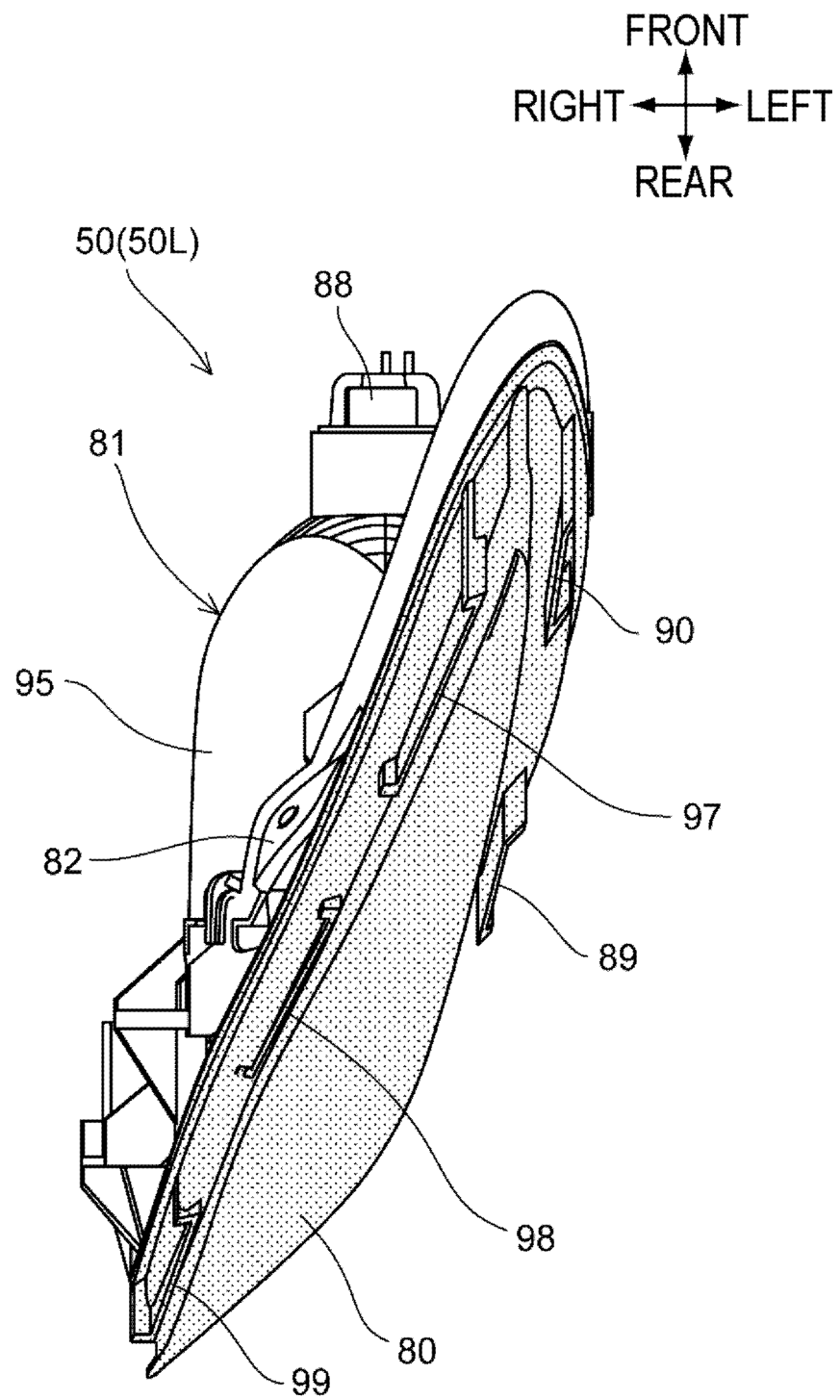
FIG. 18 is a plan view of the left blinker device.
Figure 19:
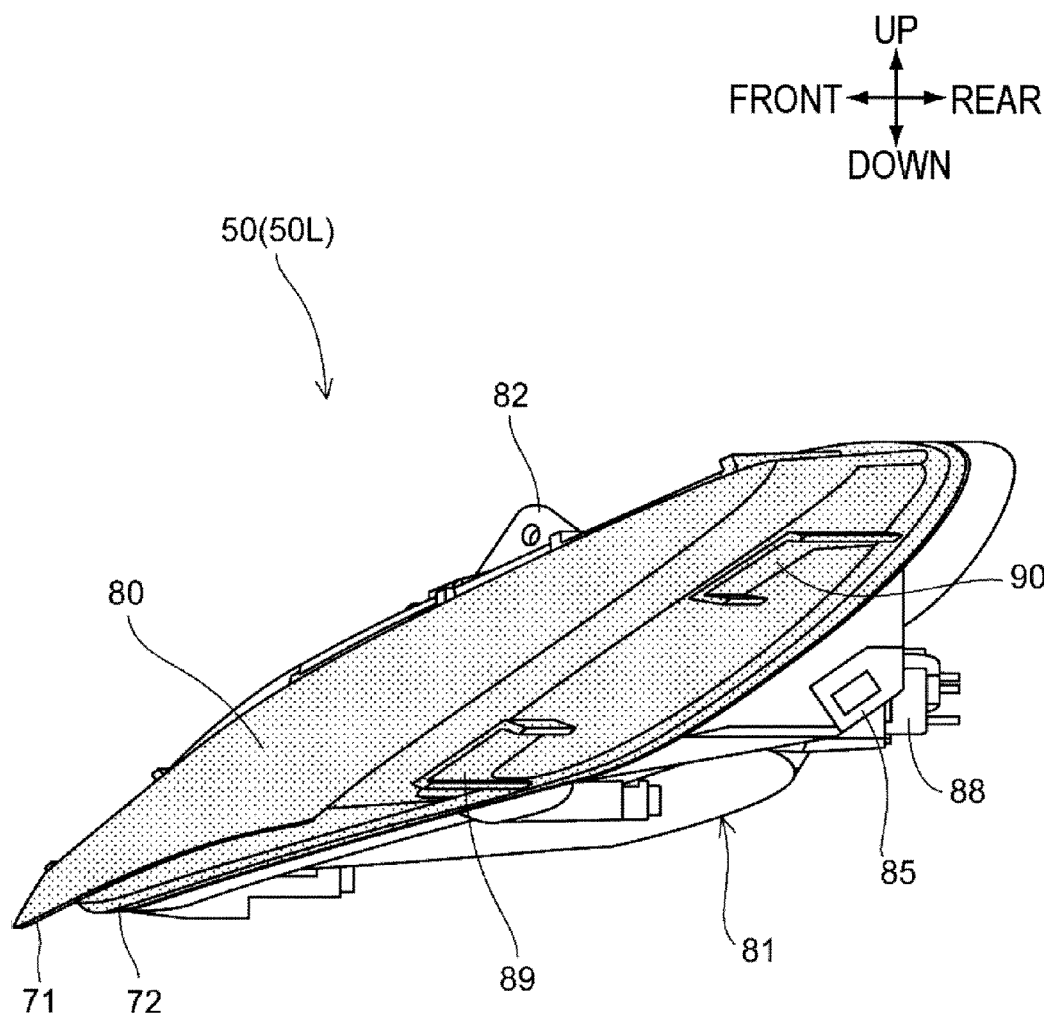
FIG. 19 is a left side view of the blinker device on a left side.
Figure 20:
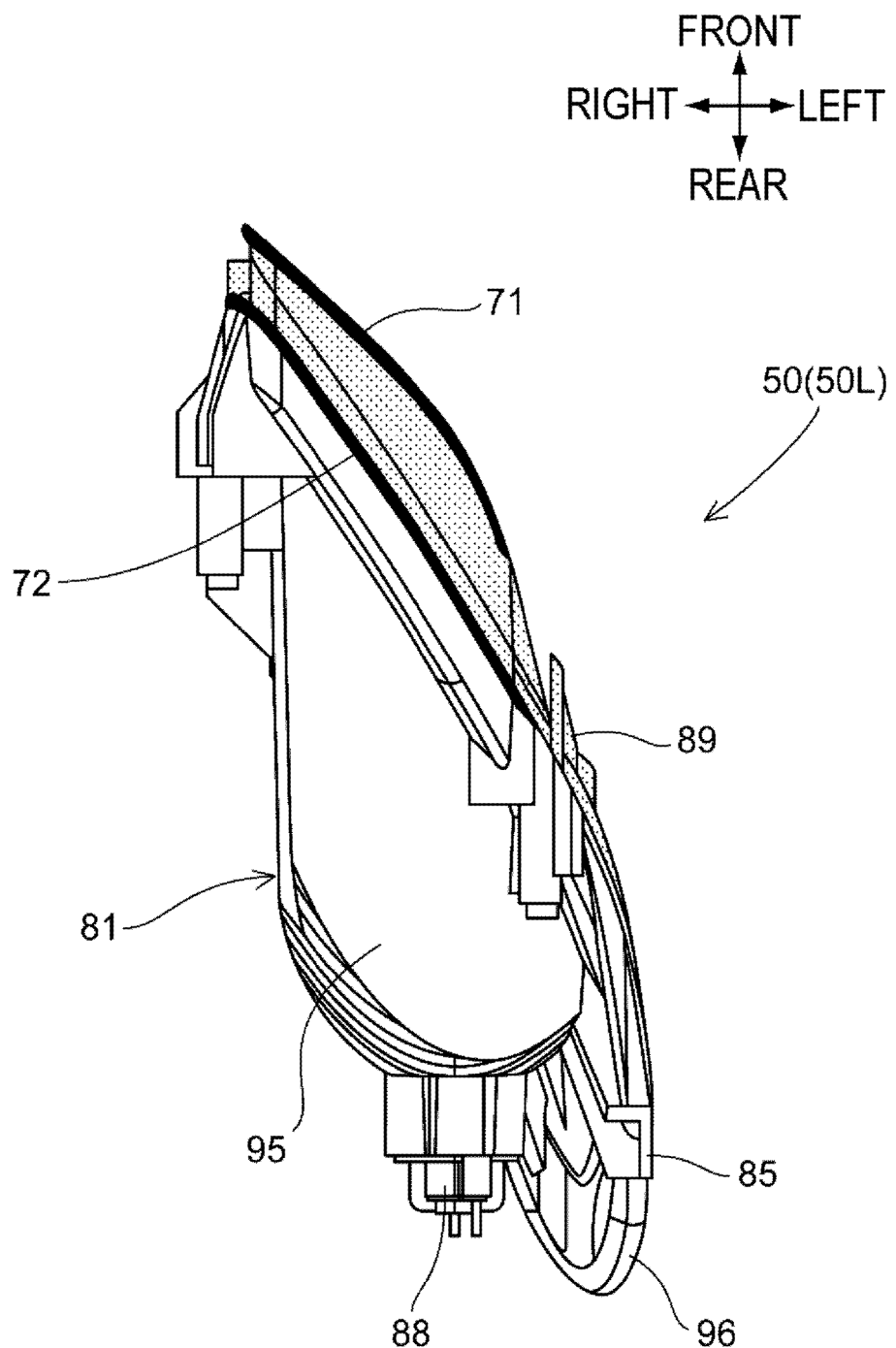
FIG. 20 is a bottom view of the left blinker device.

FIG. 18 is a plan view of the blinker device 50L (50) on a left side. FIG. 19 is a left side view of the blinker device 50L, and FIG. 20 is a bottom view of the blinker device 50L. The reflector portion 95 of the blinker housing 81 is formed into a shape having a depth in the longitudinal direction of the vehicle body. A surface of the blinker outer lens 80 is inclined rearwardly and upwardly toward a rear side of the vehicle body and also outwardly in the vehicle widthwise direction, a front end portion of the blinker outer lens 80 is positioned in front of a front end portion of the blinker housing 81 in the longitudinal direction of the vehicle body, and a rear end portion of the blinker outer lens 80 extends up to a position behind the socket 88 of the blinker bulb 87 in the longitudinal direction of the vehicle body.

As described previously, on a front end portion of the blinker outer lens 80, the outer proximate portion 71 which extends toward a front lower side of the vehicle body along a surface of the front end portion of the blinker outer lens 80 is formed. An inner proximate portion 72 which is mounted in an erected manner toward a lower side of the vehicle body is provided at a position behind the outer proximate portion 71 in the longitudinal direction of the vehicle body. The outer proximate portion 71 and the inner proximate portion 72 are formed into a plate shape having corner portions respectively, and lower end surfaces of the outer proximate portion 71 and the inner proximate portion 72 are indicated in black in FIG. 20.

Figure 21:
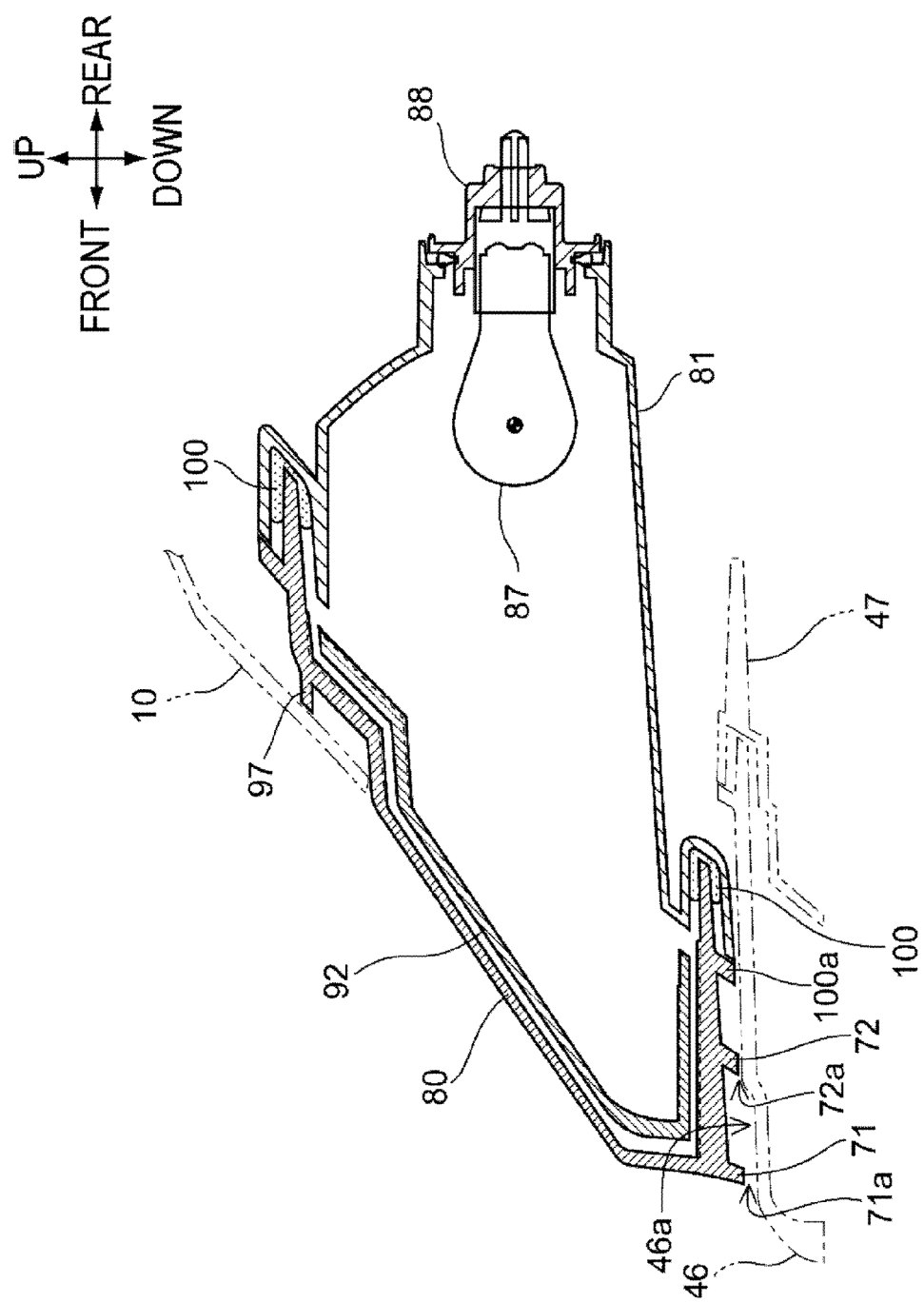
FIG. 21 is a cross-sectional view taken along a line 21-21 in FIG. 15.

FIG. 21 is a cross-sectional view taken along a line 21-21 in FIG. 15. This embodiment is characterized by the constitution that a gap formed between the front lamp outer lens (first lens) 46 of the front lamp 30 and the blinker outer lens (second lens) 80 of the blinker device 50 is defined by the outer proximate portion 71 and the inner proximate portion 72 formed on the blinker outer lens 80.

As described previously, the front lamp 30 and the blinker devices 50 are joined to each other by the engaging portions formed on the front lamp housing 47 and the blinker housings 81 respectively. Here, an end surface of each lens on a vehicle-body front side is largely spaced apart from the engaging portions of both housings toward a front side of the vehicle body and hence, there is no possibility that these engaging portions and a mating surface between the housing and the lens are visually recognized from a front side of the vehicle body. However, since the end surface of each lens on a vehicle body front side is largely spaced apart from the fixed portion of both lamps toward the front side of the vehicle body, vibrations are liable to be transmitted between the front lamp outer lens 46 and the blinker outer lens 80.

To the contrary, according to the lighting device L of this embodiment, by setting a second gap 72a formed between the inner proximate portion 72 formed on the blinker outer lens 80 and the front lamp outer lens 46 smaller than a first gap 71a formed between the outer proximate portion 71 and the front lamp outer lens 46, even when vibrations are generated between the lenses, the inner proximate portion 72 is brought into contact with the front lamp outer lens 46 firstly and hence, a change in a size of the first gap 71a can be suppressed to a minimum value.

Accordingly, it is possible to enhance the external appearance property of the lighting device by setting the gap between the lenses to a minimum value, and also even when a powdery appearance or a foggy appearance is generated due to the abrasion of the contact portions between the inner proximate portion 72 and the front lamp outer lens 46, it is possible to make the powdery appearance or the foggy appearance hardly observed.

Further, the periphery of the front lamp 30 and the periphery of the blinker devices 50 are supported on the front cowl 10 and the front side cowls 12 which are made of a resin having low rigidity compared to a steel sheet or the like and hence, even when the constitution where vibrations of the vehicle body are liable to be transmitted to the lighting device L is adopted, it is possible to prevent powder generated between the lenses from being exposed to the outside and hence, the lighting device can maintain a high external appearance property.

Further, the inner proximate portion 72 is arranged at a position where the inner proximate portion 72 overlaps with the plane P which passes the center of the front lamp bulb 53 and the center of the blinker bulb 87, and is arranged parallel to the advancing direction of the motorcycle 1 (see FIG. 5). Accordingly, the inner proximate portion 72 is arranged between the positions of the centers of gravity of the lamps and hence, the inner proximate portions 72 can receive a contact weight of the lamps which vibrate each other in a well-balanced manner.

Further, in this embodiment, the stepped portion 46a is provided at a position between the outer proximate portion 71 and the inner proximate portion 72 on the upper surface of the front lamp outer lens 46. Accordingly, the inner proximate portion 72 is arranged at the position higher than the outer proximate portion 71 and hence, when the lighting device L is viewed from an oblique front upper position, a powdery appearance or the like of the inner proximate portion 72 can be made more hardly visible. Further, due to the formation of the stepped portion 46a, it is possible to prevent moisture, dirt and the like which enter a gap between the lamps from further intruding into a deeper portion.

The blinker outer lens 80 and the blinker inner lens 92 are arranged close to each other, and the blinker outer lens 80 is engaged with the blinker housing 81 by way of a packing member 100. An engaging portion 97 which is provided to the blinker outer lens 80 has a function of preventing the deformation of an opening portion by being brought into contact with a back surface side of the front cowl 10 thus maintaining a distance between the blinker outer lens 80 and the front cowl 10 to a fixed value. A waterproof rib 100a for preventing the adhesion of water and the like to the packing member 100 is provided to a vehicle-body rear side of the inner proximate portion 72 and a vehicle-body front side of the packing member 100.

Provided that the first gap 71a and the second gap 72a having the predetermined large-and-small size relationship can be formed, the outer proximate portion 71 and the inner proximate portion 72 may not be limited to a plate shape, and may be deformed such that the outer proximate portion 71 and the inner proximate portion 72 are formed of a raised portion. Further, a raised portion or the like may be formed not only on a blinker outer lens 80 side but also on a front lamp outer lens 46 side.

Figure 22:
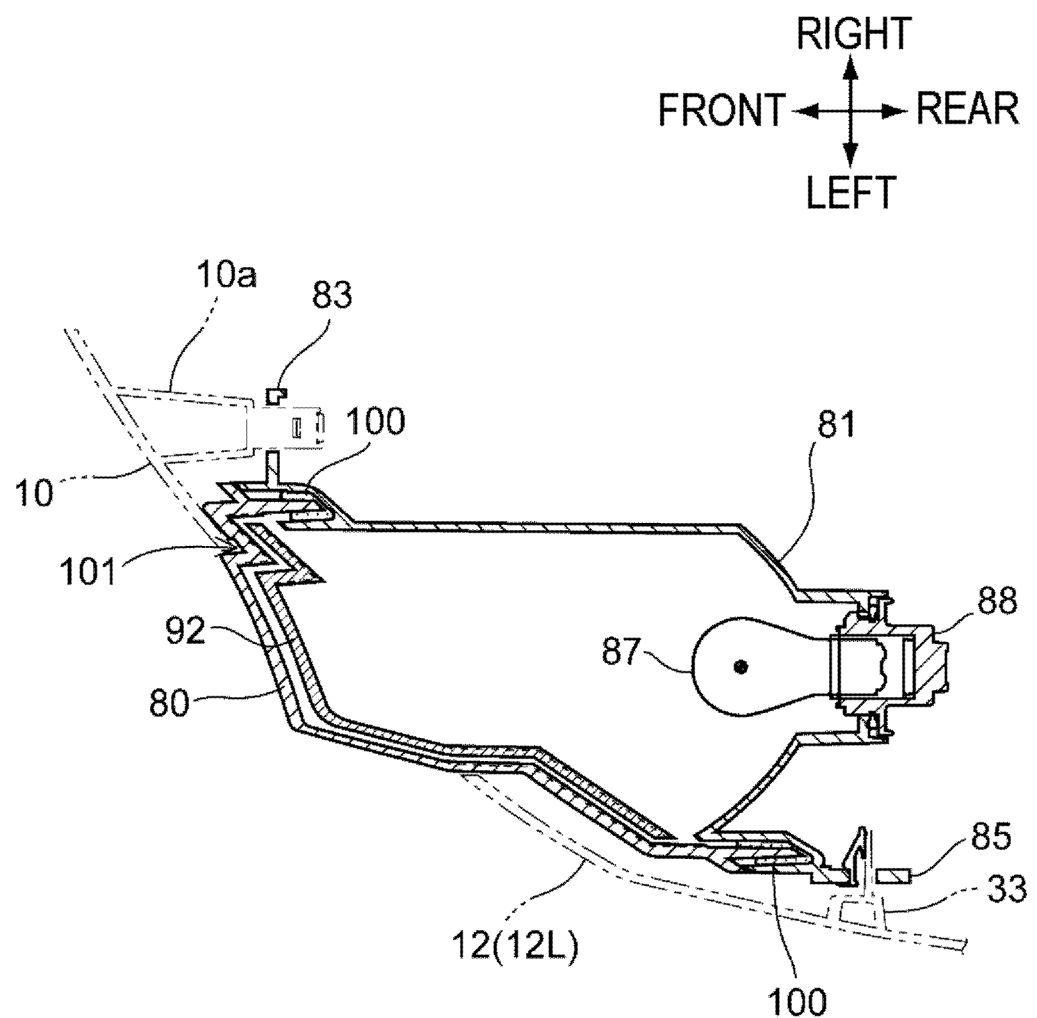
FIG. 22 is a cross-sectional view taken along a line 22-22 in FIG. 15.

FIG. 22 is a cross-sectional view taken along a line 22-22 in FIG. 15. An engaging projection 10a formed on a back surface of the front cowl 10 is engaged with the engaging portion 83 formed on an inner side of the blinker housing 81 in the vehicle widthwise direction, and an end surface of the front cowl 10 is engaged with a groove portion 101 of the blinker outer lens 80 so that the front cowl 10 is positioned. The engaging portion 33 formed on a back surface of the front side cowl 12 is engaged with the engaging portion 85 formed on an outer side of the blinker housing 81 in the vehicle widthwise direction, and a portion of an outer side of the blinker outer lens 80 in the vehicle widthwise direction is positioned outside the opening portion formed by the front side cowl 12.

Shapes and kinds of the first lamp and the second lamp, the numbers and kinds of the first lamp and the second lamp, inclination angles of lens surfaces, the engaging direction and the engaging structure between the first lamp and the second lamp, shapes of the outer proximate portion and the inner proximate portion, the shape of the vehicle body cover of the motorcycle and the like are not limited to those of the above-mentioned embodiment, and various modifications are conceivable. For example, lower end surfaces of the outer proximate portion and the inner proximate portion may be formed into a curved surface shape. The lighting device according to the present invention is not limited to a motorcycle and is applicable to various kinds of vehicles such as a saddle-ride type three-wheeled vehicle or four-wheeled vehicle.

A motorcycle according to a first technical feature of the embodiment includes: a first lamp (30) which includes a first housing (47) and a first lens (46) mounted on the first housing (47); and second lamps (50) each of which includes a second housing (81) and a second lens (80) mounted on the second housing (81), the first lamp (30) and the second lamps (50) are arranged on a surface inclined with respect to a plane orthogonal to an advancing direction of a motorcycle (1), and the first housing (47) and the second housings (81) are mounted adjacent to each other such that a surface of the first lens (46) and the surfaces of the second lens (80) form faces continuous with each other, wherein on one of the first lens (46) and the second lenses (80), an outer proximate portion (71) which extends toward the other lens along the surface of one lens, and an inner proximate portion (72) which extends toward the other lens at positions behind the outer proximate portions (71) in the longitudinal direction of a vehicle body are formed, and a second gap (72a) formed between the inner proximate portion (72) and the other lens is set smaller than a first gap (71a) formed between the outer proximate portion (71) and the other lens.

In a motorcycle according to a second technical feature of the embodiment, a periphery of the first lamp (30) and peripheries of the second lamps (50) are supported on resin-made exterior members (10, 12).

In a motorcycle according to a third technical feature of the embodiment, the inner proximate portion (72) is arranged at a position where the inner proximate portion (72) overlaps with a plane (P) which passes the center of a bulb (53) of the first lamp (30) and the center of a bulb (87) of the second lamp (50), and is parallel to the advancing direction of the motorcycle (1) or are arranged in a distributed manner on both sides of the plane (P) such that the plane (P) is sandwiched between the inner proximate portions (72).

In a motorcycle according to a fourth technical feature of the embodiment, the first lamp (30) includes a reflector (58) which is supported on an inner side of the first housing (47) in a state where an angle of the reflector (58) is changeable, a light blocking member (57) which blocks light irradiated in the direction toward the outer proximate portion (72) is arranged between an edge portion (58a) of the reflector (58) and the outer proximate portion (72), and the light blocking member (57) is fixedly supported on the first lens (46) or the first housing (47).

In a motorcycle according to a fifth technical feature of the embodiment, a rotary support portion (66) which is rotatably supported on the first housing (47) and an adjustment support portion (61, 62) having a screw mechanism for adjusting an angle of the reflector (58) using the rotary support portion (66) as a fulcrum are mounted on the reflector (58), and the rotary support portion (66) is arranged at a position closer to the outer proximate portion (71) than the adjustment support portion (61, 62).

In a motorcycle according to a sixth technical feature of the embodiment, the second lamp (50) is arranged adjacent to an upper portion of the first lamp (30), and the outer proximate portion (71) and the inner proximate portion (72) are formed on the second lamp (50).

In a motorcycle according to a seventh technical feature of the embodiment, a stepped portion (46a) which is provided between the outer proximate portion (71) and the inner proximate portion (72) for arranging the outer proximate portion (71) at a position higher than the inner proximate portion (72) is formed on the lamp (30) on one side.

In a motorcycle according to a eighth technical feature of the embodiment, the first lamp (30) is a front lamp device, the second lamps (50) are a pair of left and right blinker devices arranged on an upper surface of the first lamp (30), and the outer proximate portion (71) and the inner proximate portion (72) are plate-like members which are formed on the second lens (80) of the second lamp (50) and extend toward a front and lower side of the vehicle body.

In a motorcycle according to a ninth technical feature of the embodiment, the first lamp (30) and the second lamps (50) are arranged on a front portion of the vehicle body of the motorcycle (1) along a surface inclined rearwardly and upwardly with respect to the advancing direction of the motorcycle (1).

In a motorcycle according to a tenth technical feature of the embodiment, the first housing (46) of the first lamp (30) and the second housing (81) of the second lamp (50) are fixed to each other by fastening stays thereof formed on the respective housings by screw members.

According to the first technical feature of the embodiment, on one of the first lens and the second lenses, the outer proximate portion which extends toward the other lens along the surface of one lens, and the inner proximate portion which extends toward the other lens at the position behind the outer proximate portions in the longitudinal direction of the vehicle body are formed, and the second gap formed between the inner proximate portion and the other lens is set smaller than the first gap formed between the outer proximate portion and the other lens. Accordingly, the lenses are brought into contact with each other at the inner proximate portion, and the outer proximate portion is provided and hence, the gap between the lenses can be set to a minimum value whereby the external appearance property of the lighting device can be enhanced and, also, a powdery appearance or a foggy appearance which is generated when contact portions are abraded with each other due to vibrations can be made hardly visible as an external appearance. Further, since the inner proximate portion can be effectively concealed by the outer proximate portion, clearance at the proximate portion can be also easily set.

According to the second technical feature of the embodiment, the periphery of the first lamp and the periphery of the second lamps are supported on resin-made exterior members. Accordingly, even when the cover which supports the peripheries of both lamps is made of a resin which has low rigidity compared to a steel sheet or the like so that vibrations of the vehicle body is liable to be transmitted to the lamps, it is possible to prevent powder generated between the lenses from being exposed to the outside and hence, the lighting device can maintain a high external appearance property.

According to the third technical feature of the embodiment, the inner proximate portions are arranged at positions where the inner proximate portion overlaps with the plane which passes the center of the bulb of the first lamp and the center of the bulb of the second lamp, and is parallel to the advancing direction of the motorcycle or are arranged in a distributed manner on both sides of the plane such that the plane is sandwiched between the inner proximate portions. Accordingly, the inner proximate portion is arranged between the positions of the centers of gravity of the lamps and hence, the inner proximate portion can receive a contact weight of the lamps which vibrate each other in a well-balanced manner.

According to the fourth technical feature of the embodiment, the first lamp includes the reflector which is supported on an inner side of the first housing in a state where an angle of the reflector is changeable, the light blocking member which blocks light irradiated in the direction toward the outer proximate portion is arranged between the edge portion of the reflector and the outer proximate portion, and the light blocking member is fixedly supported on the first lens or the first housing. Accordingly, it is possible to prevent the outer proximate portion from shining due to the light emitted from the first lamp. Further, even when an angle of the reflector is adjusted for the adjustment of an optical axis, there is no change in the positional relationship between the light blocking member and the outer proximate portion and hence, light advancing toward the outer proximate portion can be surely blocked.

According to the fifth technical feature of the embodiment, the rotary support portion which is rotatably supported on the first housing and the adjustment support portion having the screw mechanism for adjusting an angle of the reflector using the rotary support portion as a fulcrum are mounted on the reflector, and the rotary support portion is arranged at a position closer to the outer proximate portion than the adjustment support portion is. Accordingly, at the time of performing the adjustment of an optical axis, a moving distance of an edge portion of the reflector on a side close to the outer proximate portion can be suppressed to a small value and hence, a size of the light blocking member can be suppressed to a minimum value.

According to the sixth technical feature of the embodiment, the second lamp is arranged adjacent to an upper portion of the first lamp, and the outer proximate portion and the inner proximate portion are formed on the second lamp. Accordingly, the accumulation of rain water, dirt, dust and the like between the lenses can be prevented with the provision of the outer proximate portion and the inner proximate portion.

According to the seventh technical feature of the embodiment, the stepped portion which is provided between the outer proximate portion and the inner proximate portion for arranging the inner proximate portion at a position higher than the outer proximate portion is formed on the lamp on one side. Accordingly, the inner proximate portion is arranged at the position higher than the outer proximate portion and hence, when the lighting device is viewed from an oblique upper position, a powdery appearance or the like of the inner proximate portion can be made more hardly visible. Further, due to the formation of a stepped portion, it is possible to prevent moisture, dirt and the like which enter a gap between the lamps from further intruding into a deeper portion.

According to the eighth technical feature of the embodiment, the first lamp is a front lamp device, the second lamps are a pair of left and right blinker devices arranged on the upper surface of the first lamp, and the outer proximate portion and the inner proximate portion are plate-like members which are formed on the second lens of the second lamp and extend toward a front and lower side of the vehicle body. Accordingly, in the lighting device where separate-type blinker devices which are spaced apart from each other in the vehicle widthwise direction are mounted on an upper portion of a front lamp, a lens surface of the front lamp and lens surfaces of the blinker devices can be continuously formed, and the accuracy in control of a clearance between both lamps can be enhanced. Further, the outer proximate portion and the inner proximate portion of the lens are formed of a plate-shaped member and hence, the lens can be formed with a small change in a mold for forming the lens thus suppressing the increase of man-hours for manufacturing lenses.

According to the ninth technical feature of the embodiment, the first lamp and the second lamps are arranged on the front portion of the vehicle body of the motorcycle along a surface inclined rearwardly and upwardly with respect to the advancing direction of the motorcycle. Accordingly, in a lighting device where the front lamp and the blinker devices can be integrally mounted, and the lighting device is formed into a shape capable of straightening a traveling wind, a gap between the front lamp and the blinker device can be suppressed to a minimum value thus enhancing an external appearance property whereby merchantability of the lighting device can be enhanced.

According to the tenth technical feature of the embodiment, the first housing of the first lamp and the second housing of the second lamps are fixed to each other by fastening stays thereof formed on the respective housings by screw members. Accordingly, the combination of the first lamp and the second lamp can be easily changed.

Obviously, numerous modifications and variations of the present invention are possible in light of the above teachings. It is therefore to be understood that within the scope of the appended claims, the invention may be practiced otherwise than as specifically described herein.

What is claimed is:

1. A lighting device for a motorcycle, comprising:
   a first lamp including a first housing and a first lens mounted on the first housing;
   a second lamp including a second housing and a second lens mounted on the second housing, the first lamp and the second lamp being arranged on a surface inclined with respect to a plane orthogonal to a front-rear direction of a vehicle body of the motorcycle, the first housing and the second housing being mounted adjacent to each other such that a surface of the first lens and a surface of the second lens are substantially continuous with each other;
   a first outer proximate portion provided on one of the first and second lenses and extending toward another of the first and second lenses along a surface of said one of the first and second lenses; and
   a first inner proximate portion provided on said one of the first and second lenses and extending toward said another of the first and second lenses, the inner proximate portion being provided behind the first outer proximate portion in the front-rear direction of the vehicle body, a first gap being provided between the first outer proximate portion and said another of the first and second lenses, a second gap being provided between the first inner proximate portion and said another of the first and second lenses, the second gap being smaller than the first gap.

2. The lighting device for a motorcycle according to claim 1, wherein a periphery of the first lamp and a periphery of the second lamp are supported on resin-made exterior members provided in the vehicle body.

3. The lighting device for a motorcycle according to claim 1, wherein the first inner proximate portion is arranged to overlap a virtual plane which passes a center of a bulb of the first lamp and a center of a bulb of the second lamp, the virtual plane being parallel to the front-rear direction of the motorcycle.

4. The lighting device for a motorcycle according to claim 1, further comprising:
   a third lamp including a third housing and a third lens mounted on the third housing, the first lamp and the third lamp being arranged on a surface inclined with respect to a plane orthogonal to the front-rear direction, the first housing and the third housing being mounted adjacent to each other such that the surface of the first lens and a surface of the third lens are substantially continuous with each other;
   a second outer proximate portion provided on one of the first and third lenses and extending toward another of the first and third lenses along a surface of said one of the first and third lenses; and
   a second inner proximate portion provided on said one of the first and third lenses and extending toward said another of the first and third lenses, the second inner proximate portion being provided behind the second outer proximate portion in the front-rear direction of the vehicle body, a third gap being formed between the second outer proximate portion and said another of the first and third lenses, a fourth gap being formed between the second inner proximate portion and said another of the first and third lenses, the fourth gap being smaller than the third gap.

5. The lighting device for a motorcycle according to claim 4, wherein the first and second inner proximate portions are arranged on both sides of a virtual plane such that the virtual plane is provided between the first and second inner proximate portions, the virtual plane passing a center of a bulb of the first lamp and a center of a bulb of the second lamp.

6. The lighting device for a motorcycle according to claim 1, further comprising:
   a light blocking member to block light emitted toward the outer proximate portion,
   wherein the first lamp includes a reflector supported on an inner side of the first housing in a state where an angle of the reflector is changeable,
   wherein the light blocking member is arranged between an edge portion of the reflector and the outer proximate portion, and
   wherein the light blocking member is fixedly supported on the first lens or the first housing.

7. The lighting device for a motorcycle according to claim 6,
   wherein the first lamp includes
      a rotary support portion rotatably supported on the first housing, and
      an adjustment support portion to adjust an angle of the reflector using the rotary support portion as a fulcrum, and
   wherein the rotary support portion is closer to the first outer proximate portion than the adjustment support portion.

8. The lighting device for a motorcycle according to claim 1,
   wherein the second lamp is arranged adjacent to an upper portion of the first lamp.

9. The lighting device for a motorcycle according to claim 8, wherein a stepped portion is provided between the first outer proximate portion and the first inner proximate portion to arrange the first outer proximate portion at a position higher than the first inner proximate portion, the stepped portion being provided on the first lamp.

10. The lighting device for a motorcycle according to claim 1,
    wherein the first lamp comprises a front lamp device,
    wherein the second lamp comprises one of left and right blinker devices and is arranged on an upper surface of the first lamp, and
    wherein the first outer proximate portion and the first inner proximate portion have a plate shape and are provided on the second lens of the second lamp, the first outer proximate portion and the first inner proximate portion extending toward a front and lower side of the vehicle body.

11. The lighting device for a motorcycle according to claim 10, wherein the first lamp and the second lamps are arranged on a front portion of the vehicle body of the motorcycle along a surface inclined rearwardly and upwardly with respect to the front-rear direction.

12. The lighting device for a motorcycle according to claim 1,
    wherein the first housing of the first lamp includes a first fastening stay,
    wherein the second housing of the second lamp includes a second fastening stay, and wherein the first fastening stay and the second fastening stay are fixed to each other by a screw member.

* * * * *